(12) United States Patent
Tatsuta et al.

(10) Patent No.: US 9,538,165 B2
(45) Date of Patent: Jan. 3, 2017

(54) IMAGE DISPLAY APPARATUS

(71) Applicant: Kabushiki Kaisha Toshiba, Minato-ku (JP)

(72) Inventors: Shinichi Tatsuta, Tokyo (JP); Hideaki Okano, Kanagawa-ken (JP); Hidefumi Takamine, Tokyo (JP); Hiroshi Hasegawa, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 314 days.

(21) Appl. No.: 14/203,659

(22) Filed: Mar. 11, 2014

(65) Prior Publication Data

US 2014/0267639 A1 Sep. 18, 2014

(30) Foreign Application Priority Data

Mar. 13, 2013 (JP) .................................. 2013-051065
Jun. 28, 2013 (JP) .................................. 2013-137222

(51) Int. Cl.
*H04N 13/04* (2006.01)

(52) U.S. Cl.
CPC ...... *H04N 13/0447* (2013.01); *H04N 13/0404* (2013.01)

(58) Field of Classification Search
CPC .............. G02B 27/2214; G02B 27/225; H04N 13/0232; H04N 13/0228; H04N 13/0404; H04N 13/0406
See application file for complete search history.

(56) References Cited

U.S. PATENT DOCUMENTS

| 5,896,230 | A | * | 4/1999 | Goggins | ............ | G02B 27/2214 |
| | | | | | | 355/22 |
| 6,396,636 | B2 | * | 5/2002 | Sawaki | .................. | G02B 3/005 |
| | | | | | | 348/E9.024 |
| 2006/0092158 | A1 | * | 5/2006 | Shestak | .............. | G02B 27/2292 |
| | | | | | | 345/424 |

(Continued)

FOREIGN PATENT DOCUMENTS

| JP | 7-19029 | 3/1995 |
| JP | 7-281328 | 10/1995 |

(Continued)

OTHER PUBLICATIONS

U.S. Appl. No. 14/203,670, filed Mar. 11, 2014, Tatsuta.
U.S. Appl. No. 14/101,885, filed Dec. 10, 2013.

*Primary Examiner* — Sath V Perungavoor
*Assistant Examiner* — Clifford Hilaire
(74) *Attorney, Agent, or Firm* — Oblon, McClelland, Maier & Neustadt, L.L.P.

(57) ABSTRACT

In one embodiment, an image display apparatus includes: a projecting portion which projects in a second direction orthogonal to a first direction a first beam having a disparity image component which forms an image having a disparity in the first direction; a first deflecting portion which deflects the first beam in the second direction in a first plane having an axis in the first direction and an axis in the second direction, and obtains a second beam; and a second deflecting portion which further deflects in the first plane the second beam in a same direction as the second direction in which the first deflecting portion deflects the first beam, obtains a third beam and projects the third beam.

5 Claims, 22 Drawing Sheets

(56) References Cited

U.S. PATENT DOCUMENTS

| | | | | |
|---|---|---|---|---|
| 2008/0204548 A1* | 8/2008 | Goulanian | ......... | G02B 27/2214 348/51 |
| 2009/0091919 A1* | 4/2009 | Goto | ................ | G02F 1/133606 362/97.1 |
| 2012/0327132 A1 | 12/2012 | Tatsuta et al. | | |
| 2013/0258446 A1 | 10/2013 | Tatsuta et al. | | |

FOREIGN PATENT DOCUMENTS

| | | |
|---|---|---|
| JP | 2002-55309 | 2/2002 |
| JP | 2005-18070 | 1/2005 |
| JP | 2007-199452 | 8/2007 |
| JP | 4357814 | 11/2009 |

\* cited by examiner

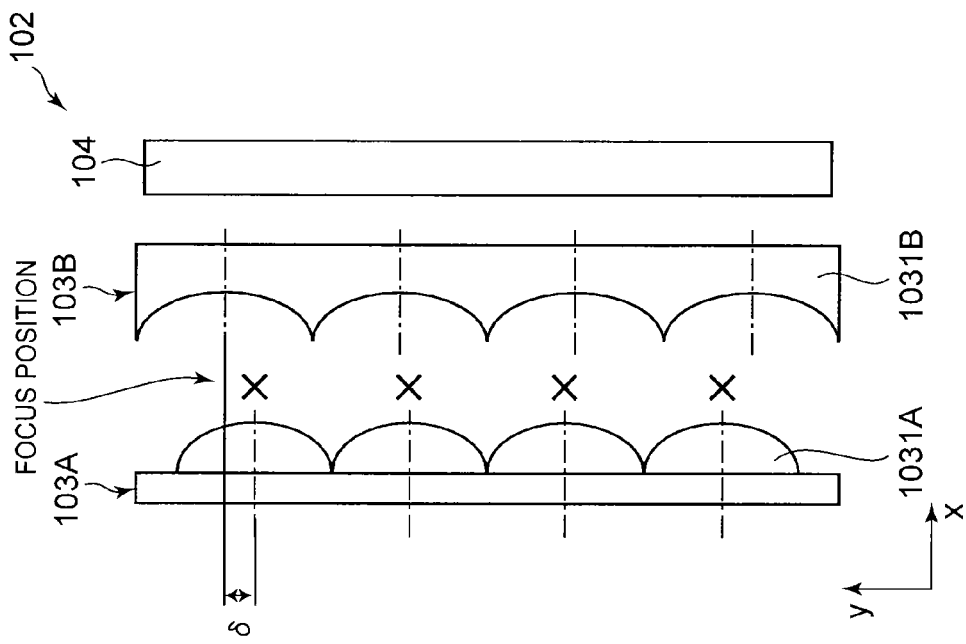
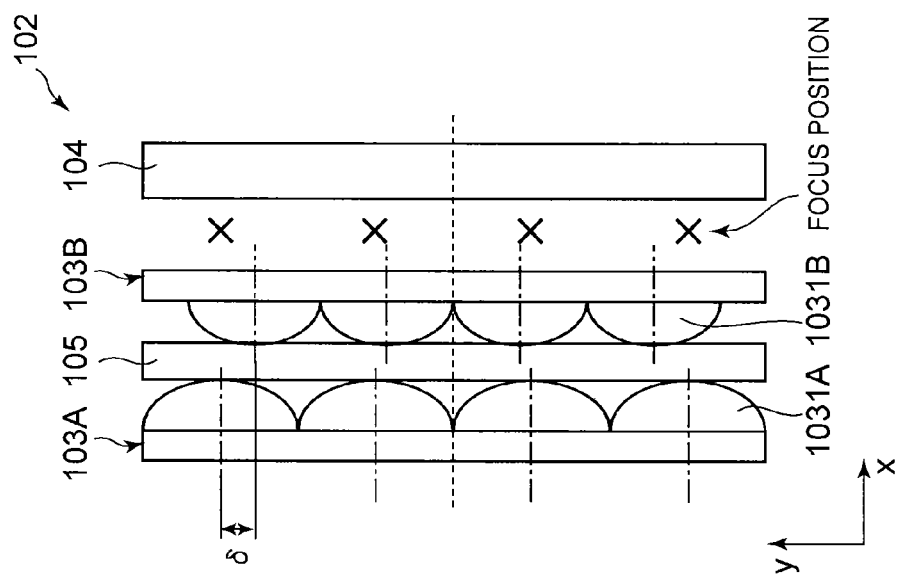
FIG. 9B
FIG. 9A

IMAGE DISPLAY APPARATUS

CROSS-REFERENCE TO RELATED APPLICATION

This application is based upon and claims the benefit of priority from the prior Japanese Patent Applications No. 2013-051065, filed on Mar. 13, 2013, No. 2013-137222, filed on Jun. 28, 2013, the entire contents of which are incorporated herein by reference.

FIELD

Embodiments described herein relate generally to an image display apparatus.

BACKGROUND

Although a technique of generating an image of multiple disparities (for example, a stereoscopic image) using lenticular lenses is widely known, it is difficult to expand a viewing zone angle which indicates a range in which an image can be normally observed. When a viewing zone angle is expanded by increasing refraction angles of beams which form an image using lenticular lenses, the aberration increases and the beams produce crosstalk between disparities. For this reason, the beams are deflected in unintended directions.

BRIEF DESCRIPTION OF THE DRAWINGS

FIGS. 9A and 9B are views illustrating an image display portion according to a second modification;

DETAILED DESCRIPTION

An image display apparatus according to embodiments will be described with reference to the drawings.

First Embodiment

Figure 1A:
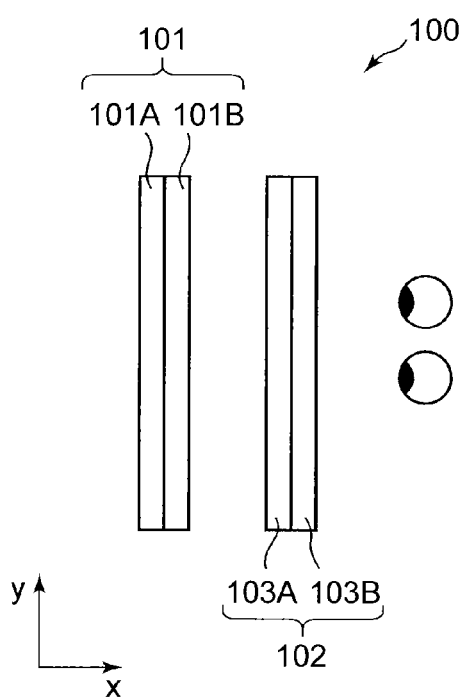
FIGS. 1A and 1B are schematic diagrams of an image display apparatus according to a first embodiment.
Figure 1B:
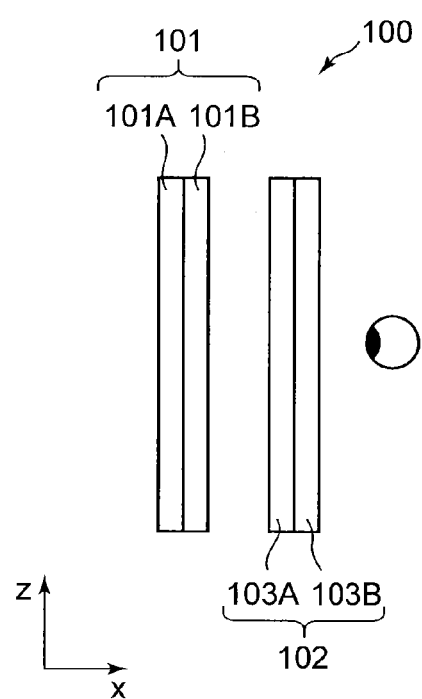

A first embodiment will be described with reference to FIGS. 1A and 1B. FIGS. 1A and 1B are schematic views of an image display apparatus 100 according to the first embodiment. FIG. 1A illustrates the image display apparatus 100 in a horizontal field of view (in a horizontal plane) in which both eyes of an observer are drawn, and FIG. 1B illustrates the image display apparatus 100 in a vertical field of view (in a vertical plane) in which one eye of the observer is drawn. In addition, the terms "horizontal" and "vertical" are based on the both eyes of the observer, and do not necessarily mean strictly defined "horizontal" and "vertical". That is, a field of view in which the both eyes are arranged and a plane which is nearly parallel to this field of view are defined as the horizontal plane (x-y plane) (first plane), and a plane which is nearly orthogonal to this horizontal plane is defined as a vertical plane (x-z plane).

The image display apparatus 100 includes an image projecting portion 101 and an image display portion 102. The image projecting portion 101 is a planar member which is provided on a y-z plane. This image projecting portion 101 projects in an x axis direction (second direction) a plurality of beams (first beams) including disparity image components which form an image (projected image) including disparities in a y axis direction (first direction). The image display portion 102 is a planar member which is provided on the y-z plane to oppose to the plane of the image projecting portion 101. This image display portion 102 includes a first deflecting portion 103A and a second deflecting portion 103B. The first deflecting portion 103A obtains the second beams by deflecting the first beams in the x-y plane. The second deflecting portion 103B obtains third beams by further deflecting the second beams in the x-y plane, and projects the third beams in a direction matching the disparity image components of an observation region set ahead of the image display apparatus 100. The observer can stereoscopically view the projected image by observing from the observation region a plurality of third beams projected by the image display portion 102.

Figure 2:
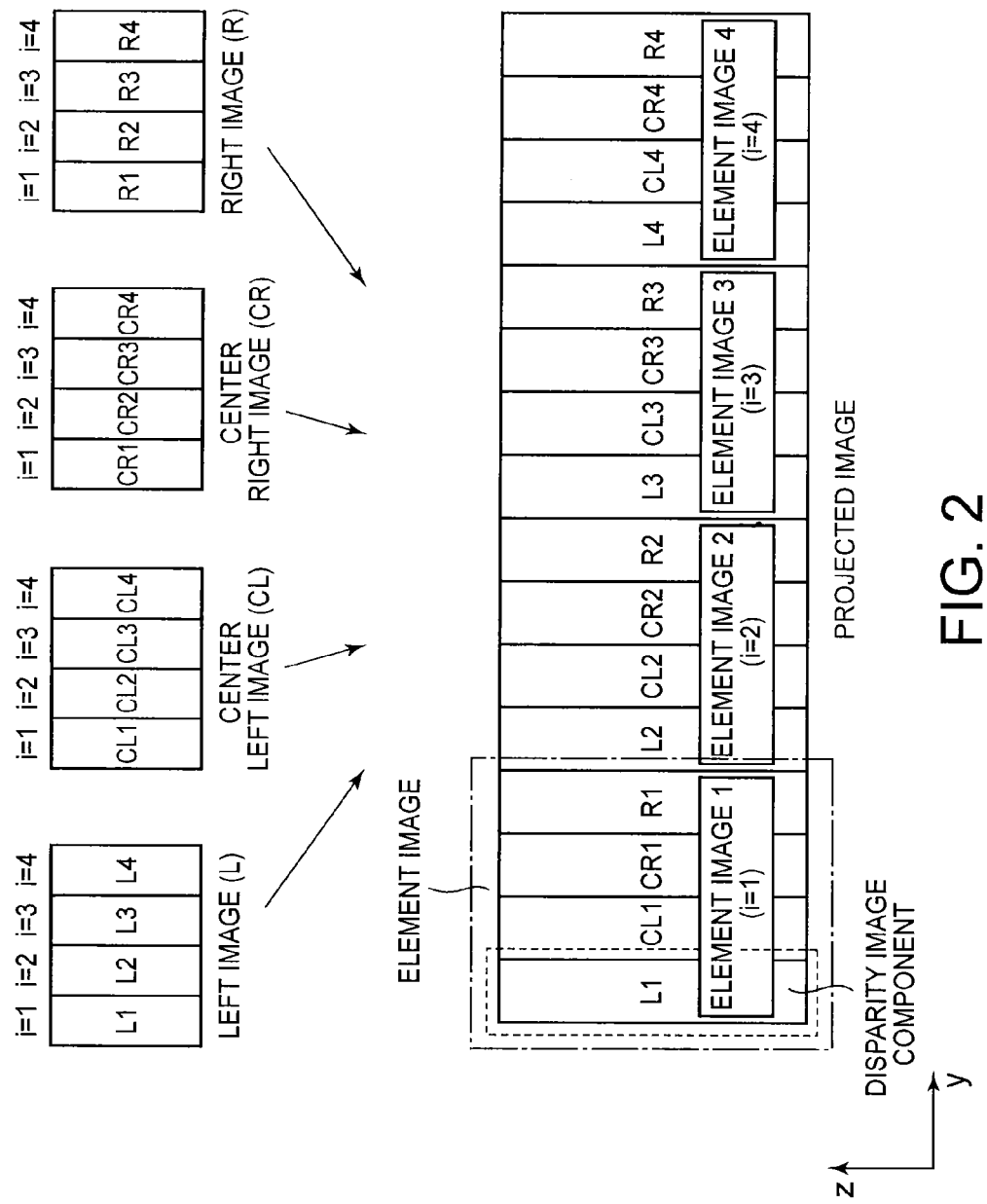
FIG. 2 is a view for explaining a projected image according to the first embodiment.

Here, FIG. 2 is a view for explaining a projected image. In addition, the projected image in this example is an image including four disparities. The following description will be made on the basis of the projected image unless specified in particular.

A projected image is generated from a plurality of disparity images from multiple cameras by capturing images of a subject by the multiple cameras arranged on a given reference plane. Further, disparity images of a plurality of points of view may be created by computation from images created by rendering to generate an image which the observer stereoscopically views from these disparity images. Each disparity image is divided into a plurality of (number i) disparity image components. This disparity image component is an image segment of a stripe shape, and a projected image is generated by further aligning element images i obtained by aligning disparity image components to which the identical number i is assigned. The projected image generated in this way includes a plurality of pixels.

In the example in FIG. 2, four disparity images whose number is equal to the number of disparities, that is, left (L), center left (CL), center right (CR) and right (R) images, are used. In addition, a positional relationship between the left, the center left, the center right and the right corresponds to a positional relationship when, for example, images are captured using cameras. Disparity images are divided into four disparity image components, that is, into L1 to L4, CL1 to CL4, CR1 to CR4 and R1 to R4, respectively. By aligning L1, CL1, CR1 and R1 while holding a positional relationship of the disparity images, an element image 1 is obtained. Similarly, an element image 2 is obtained from L2, CL2, CR2 and R2, an element image 3 is obtained from L3, CL3, CR3 and R3 and an element image 4 is obtained from L4, CL4, CR4 and R4. Meanwhile, holding a positional relationship means that, when an original disparity image from which disparity image components are obtained is a left image, the disparity image components are positioned on the left in an element image and, similarly, when disparity images are center left, center right and right images, disparity image components are positioned on the center left, the center right and the right in element images, respectively. These element image 1 to element image 4 are aligned in order of numbers to form a projected image.

The image projecting portion 101 illustrated in FIGS. 1A and 1B includes a light source 101A and a light modulating unit 101B.

The light source 101A is a surface emitting device in which a plurality of light emitting elements such as LDs (Laser Diodes) is planarly aligned and a plurality of beams is emitted to the light modulating unit 101B. The beams to be emitted to the light modulating unit 101B preferably have small beam widening angles and high directional characteristics. From a view point of low power consumption, LEDs, organic ELs and LDs are preferably used. Further, LDs are preferable from viewpoints of color reproducibility, reduction in beams, and easiness to generate disparities by way of adjustment of beam emission angles and beam widths.

The light modulating unit 101B generates beams matching pixels which an image (projected image) includes by modulating colors of beams received from the light source 101A. A plurality of beams emitted as a projected image from this light modulating unit 101B includes a plurality of disparity image components as described above. The light modulating unit 101B is, for example, a SLM (spatial light modulator), and a liquid crystal display panel of a flat panel type (such as a LCOS) can be used therefor.

A projector which includes the light source 101A such as a halogen lamp and the light modulating unit 101B such as a LCOS may be used for the image projecting portion 101.

Figure 3B:
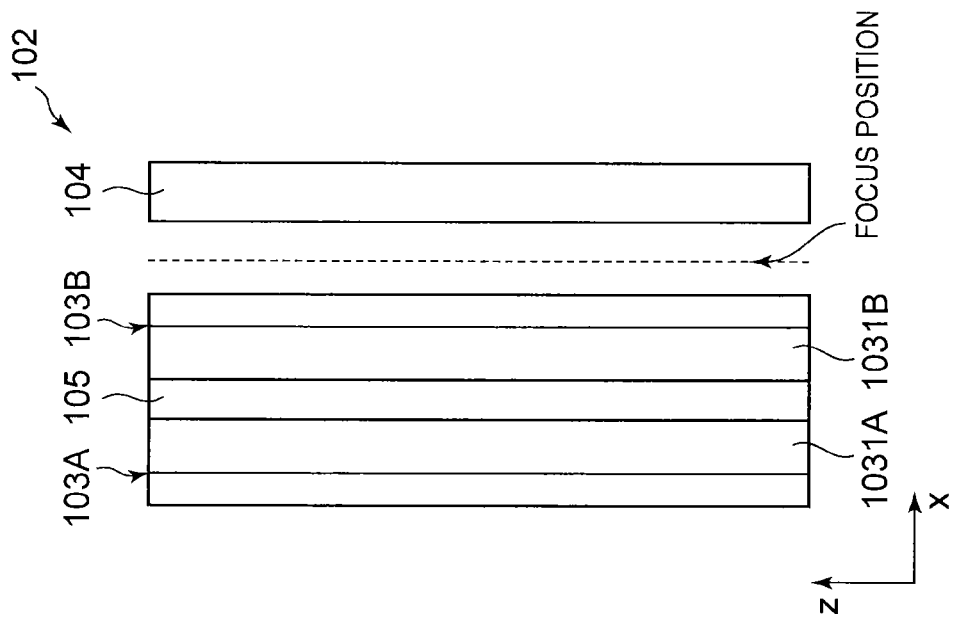
FIGS. 3A and 3B are views illustrating an image display portion according to the first embodiment.
Figure 3A:
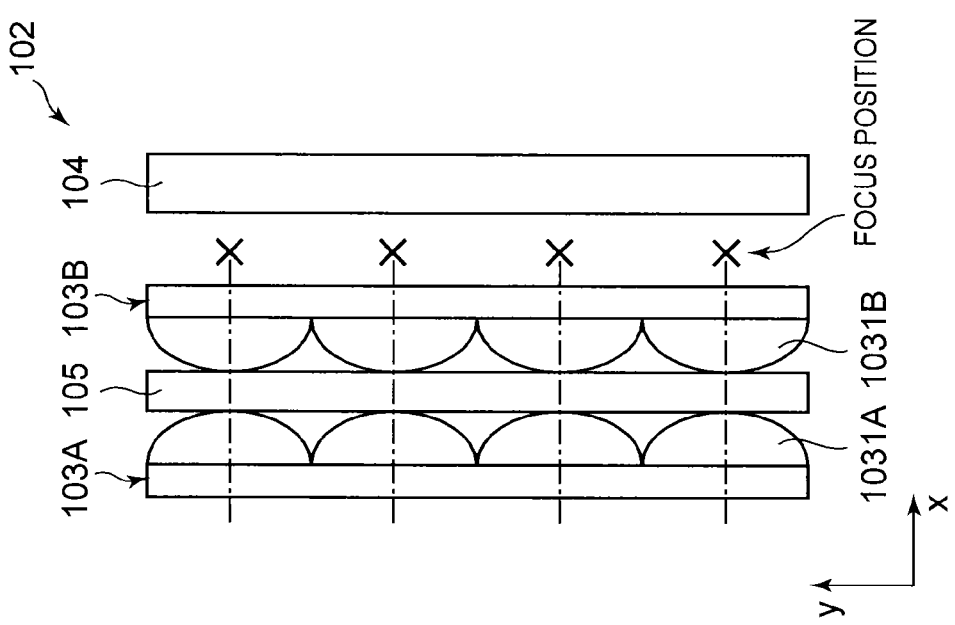

FIGS. 3A and 3B are views illustrating the image display portion 102 in FIGS. 1A and 1B. FIG. 3A illustrates the image display portion 102 in a horizontal field of view (in a horizontal plane) in which the both eyes of the observer are drawn, and FIG. 3B illustrates the image display portion 102 in the vertical field of view (in a vertical plane) in which one eye of the observer is drawn.

The image display portion 102 includes the first deflecting portion (first lenticular lens) 103A and the second deflecting portion (second lenticular lens) 103B. Further, when LDs are used for the light source 101A, the image display portion 102 includes a diffusing portion 104. By providing, for example, frames (not illustrated) to these components, it is possible to fix the components while maintaining a relative positional relationship. Further, a transparent plate 105 may be provided between the first lenticular lens 103A and the second lenticular lens 103B where necessary to stably fix the components.

Figure 4A:
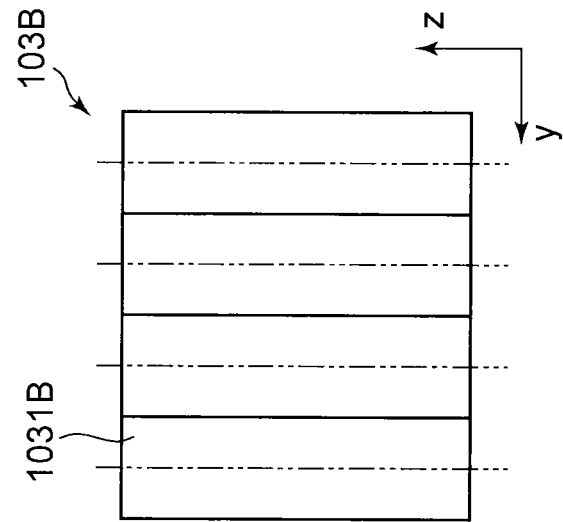
FIGS. 4A and 4B are views illustrating first and second lenticular lenses according to the first embodiment.

The first lenticular lens 103A has a convex surface having a positive refractive power, and deflects the beams (first beams) projected by the image projecting portion 101, in the y axis direction in the horizontal plane (x-y plane). That is, the first lenticular lens 103A deflects the first beams by rotating the first beams in a positive or negative rotation direction about the z axis. In addition, the rotation described herein is rotation in a range in which positive and negative signs of an x axis component and a y axis component which are unit vectors of the first beam in the y axis direction do not change. By this means, disparity image components included in an image (projected image) are separated. This deflected light is emitted to the second lenticular lens 103B. Here, the first lenticular lens 103A illustrated in FIG. 4A is a sheet member in which a plurality of convex first cylindrical lenses 1031A which has a bus (dashed-two dotted lines in FIG. 4A) in the z axis direction (third direction), that is, which is thin in the vertical direction is aligned in the y axis direction. Pitches of these first cylindrical lenses 1031A (widths in the y axis direction) are about the same as pitches of element images (widths of disparity image components in an alignment direction) included in a projected image.

The second lenticular lens 103B has convex surfaces having positive refractive powers, and further deflects the beams in the horizontal plane (x-y plane) and in the same direction as the y axis direction in which the first lenticular lens 103A deflects the first beams by further refracting the beams (second beams) projected by the first lenticular lens 103A. By this means, the beams (third beams) are emitted at angles matching the disparity image components to the diffusing portion 104. Here, angles matching disparity image components can be set in advance by determining in advance an (intended) image which the observer needs to observe.

Figure 4B:
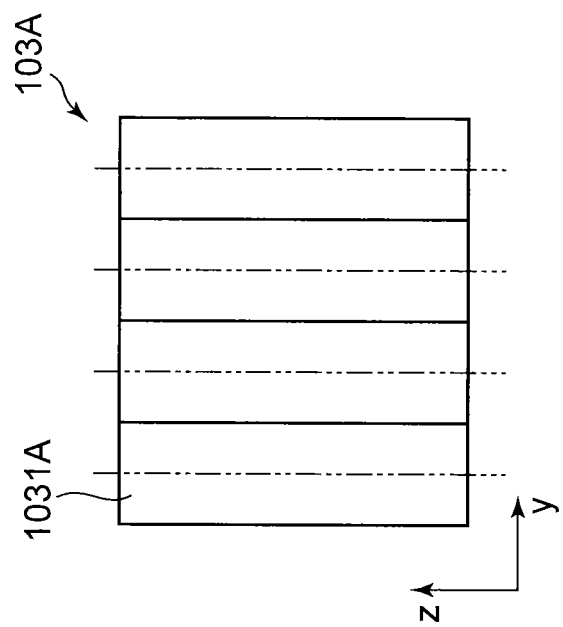

The second lenticular lens 103B illustrated in FIG. 4B is a sheet member in which a plurality of convex second cylindrical lenses 1031B which has a bus (dashed-two dotted lines in FIG. 4B) in the z axis direction is aligned in the y axis direction. The second lenticular lens 103B is provided to match the optical axes of the first cylindrical lenses 1031A which oppose to the optical axes (dashed-dotted lines in FIG. 3A) of the second cylindrical lenses 1031B. Further, convex incident surfaces are provided closer (rearward) to the first lenticular lens 103A than focus positions (symbols × in FIG. 3A) of the first cylindrical lenses 1031A. Pitches of the second cylindrical lenses 1031B (widths in the y axis direction) are about the same as pitches of the first cylindrical lenses 1031A (widths in the y axis direction).

Figure 5A:
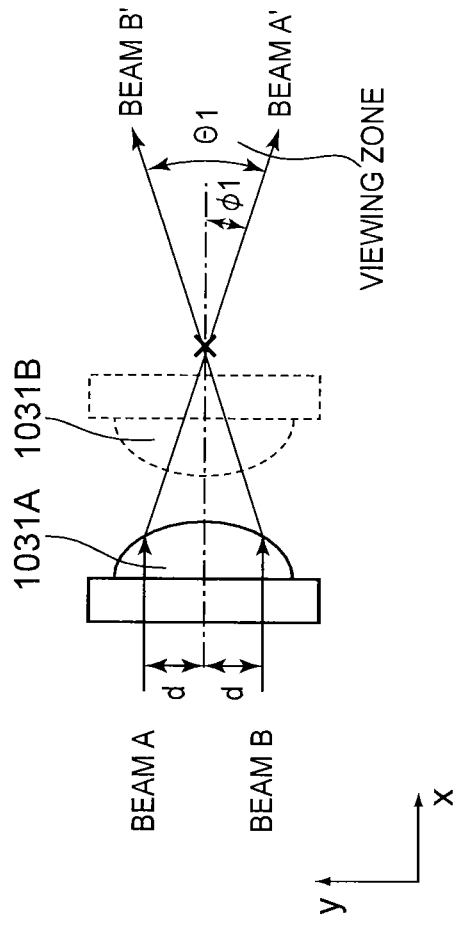
FIGS. 5A and 5B are views for explaining a viewing zone angle according to the first embodiment.
Figure 5B:
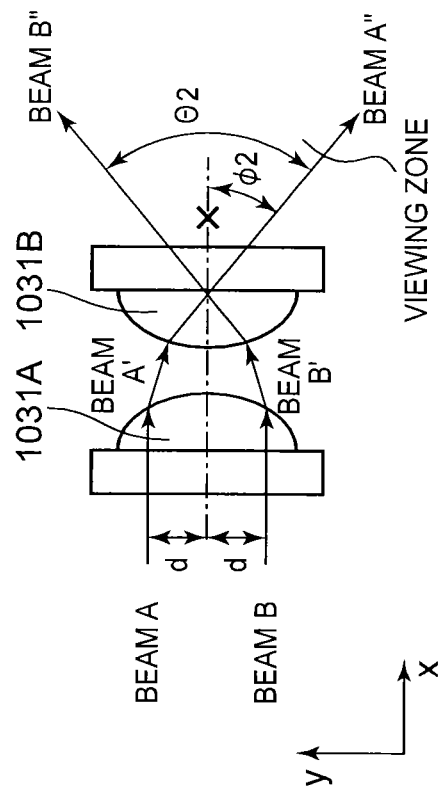

FIGS. 5A and 5B are views for explaining a first viewing zone angle $\theta 1$ and a second viewing zone angle $\theta 2$.

Here, a viewing zone angle refers to a range in which the observer can stereoscopically view a projected image in an observation region (an angle indicating the range). The viewing zone angle in this case is defined as an angle (<180°) formed by two beams which are deflected when the two beams which are parallel about the optical axis of a lenticular lens enter the lenticular lens.

As illustrated in FIG. 5A, when it is assumed that there is no second lenticular lens 103B, two parallel beams A and B which are spaced distances d apart from the optical axis of the first cylindrical lens 1031A of the first lenticular lens 103A enter the first lenticular lens 103A, and an angle θ1 (<180°) formed at the focus positions by a beam A' and a beam B' refracted at an angle φ1 (<90°) formed by the optical axis of the first cylindrical lens 1031A is defined as a first viewing zone angle.

Further, as illustrated in FIG. 5B, the beam A' and the beam B' enter the second lenticular lens 103B, and an angle θ2 (θ1<θ2<180°) formed by a beam A' and a beam B' refracted at an angle φ2 (φ1<φ2<90°) formed by the optical axis of the second cylindrical lens 1031B is defined as a second viewing zone angle.

The diffusing portion 104 diffuses in the vertical direction the beams projected by the second lenticular lens 103B. The diffusing portion 104 preferably uses an anisotropic diffusing plate whose material is, for example, plastic to diffuse the beams in the vertical direction and suppress diffusion of the beams in the horizontal direction. By displaying the disparity images on the diffusing portion 104, the observer can recognize in the observation region a stereoscopic image in front or at the back of the diffusing portion 104. In addition, when light emitting elements other than LDs, such as LEDs for example, are used for the light source 101A and the diffusing portion 104 is not provided, the observer can recognize in the observation region a stereoscopic image in front or at the back of the second lenticular lens 103B by directly observing the beams emitted from the second lenticular lens 103B.

Figure 6:
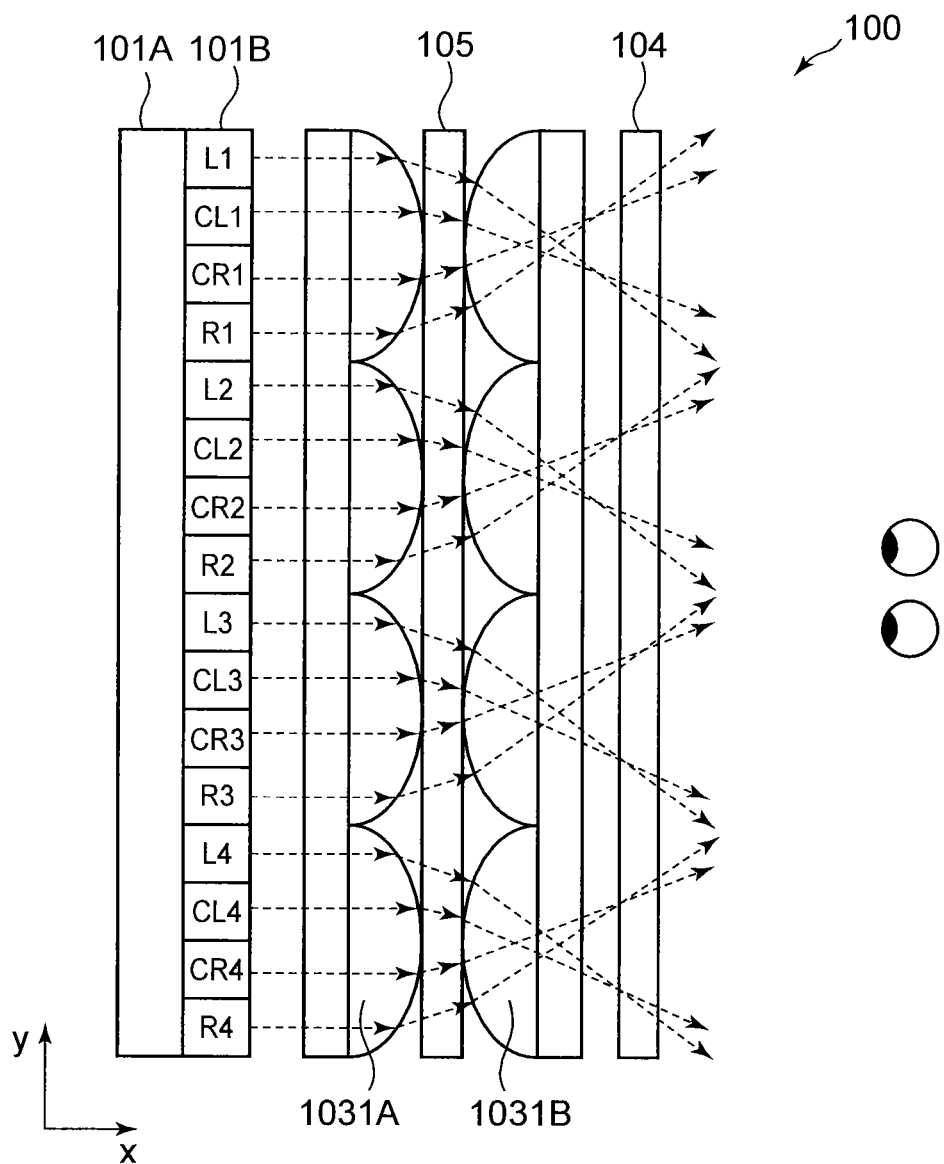
FIG. 6 is a view for explaining a function of the image display apparatus according to the first embodiment.

A function of the image display apparatus 100 according to the first embodiment will be described below with reference to FIG. 6. In FIG. 6, a projected image to be projected is indicated by a pattern of segments aligned in order of disparity image components L1, CL1, CR1, R1, L2, CL2, CR4 and R4.

Each segment projects beams including disparity image components, to the first lenticular lens 103A. In addition, FIG. 6 illustrates only beams parallel to the optical axes of the first lenticular lenses among beams to be projected. As illustrated in FIG. 6, one first cylindrical lens 1031A meets four disparity image components corresponding to one element image. That is, beams including disparity image components enter the different first cylindrical lenses 1031A per element image.

The beam entering the first cylindrical lens 1031A is refracted in a direction toward the optical axis (inward) by a positive refractive power of the first cylindrical lens 1031A. That is, beams including the disparity image components L1 to L4 and CL1 to CL4 are refracted in the left and center left directions seen from the observer, and beams including the disparity image components CR1 to CR4 and R1 to R4 are refracted in the center right and right directions seen from the observer. In this case, the beams are emitted at different angles per disparity image component from the first cylindrical lenses 1031A, so that it is possible to separate a plurality of disparity image components in different directions. The beams emitted from the first cylindrical lenses 1031A pass through the transparent plate 105, and enter the different second cylindrical lenses 1031B per element image.

The beams entering the second cylindrical lenses 1031B are further refracted in a direction toward the optical axis (inward) by positive refractive powers of the second cylindrical lenses 1031B. That is, the beams including the disparity image components L1 to L4 and CL1 to CL4 are further refracted in the left and center left directions seen from the observer, and the beams including the disparity image components CR1 to CR4 and R1 to R4 are further refracted in the center right and right directions seen from the observer. By this means, the beams including the disparity image components are emitted in directions matching the disparity image components. Thus, the beams including the disparity image components separated by the first cylindrical lenses 1031A are deflected in directions in which the viewing zone angle is widen.

The beams emitted from the second cylindrical lenses 1031B are diffused in the vertical direction by the diffusing portion 104, and are projected on the observation region. The observer can stereoscopically view an image formed by these beams including the disparity image components by observing the image in the observation region.

Here, for example, increasing refraction angles of cylindrical lenses to widen a viewing zone angle using a single lenticular lens is assumed. In this case, the aberration increases and beams including disparity image components are emitted at angles different from predetermined angles, and therefore the disparity image components are not sufficiently separated and crosstalk is produced.

Consequently, the image display apparatus 100 according to the present embodiment can widen a viewing zone angle and reduce crosstalk by refracting beams stepwise (at two stages) using two lenticular lenses (first lenticular lens 103A and second lenticular lens 103B).

In addition, the embodiment of the image display apparatus which provides disparities (horizontal disparities) only in the horizontal field of view has been described above. However, it is possible to provide vertical disparities not only in the horizontal field of view but also in the vertical field of view. In this case, disparity images which provide disparities in the horizontal and vertical fields of view are projected on a projected image by the image projecting portion 101, and the first deflecting portions 103A and the second deflecting portions 103B which have lens arrays obtained by two-dimensionally aligning lenses separate the disparity images which provide horizontal disparities and vertical disparities included in the projected image.

Further, the image projecting portion 101 may include a printing portion (printed image) 101C on which disparity image components are directly printed, instead of the light modulating unit 101B. In addition, in this case, lights reflected from the surroundings can be used, and the light source 101A only needs to be provided when necessary. In this case, light from the printing portion 101C is sufficiently diffused, so that the diffusing portion 104 may not be provided.

Further, a stereoscopic view based on disparities of both eyes do not necessarily need to be introduced for a projected image, a disparity arrangement of a density which is low to such a degree that same video images reach both eyes can also provide a good stereoscopic effect based on a motion disparity. Furthermore, by displaying completely different video images according to viewing positions instead of providing a stereoscopic effect, for example, the present invention is also applicable to give different pieces of information to people who look at a screen from the right and people who look at the screen from the left.

(First Modification)

Although an example where a second deflecting portion (second lenticular lens) 103B has convex second cylindrical lenses 1031B in an image display portion 102 illustrated in FIGS. 3A and 3B has been described, the present invention is not limited to this.

Figures 7A, 7B:
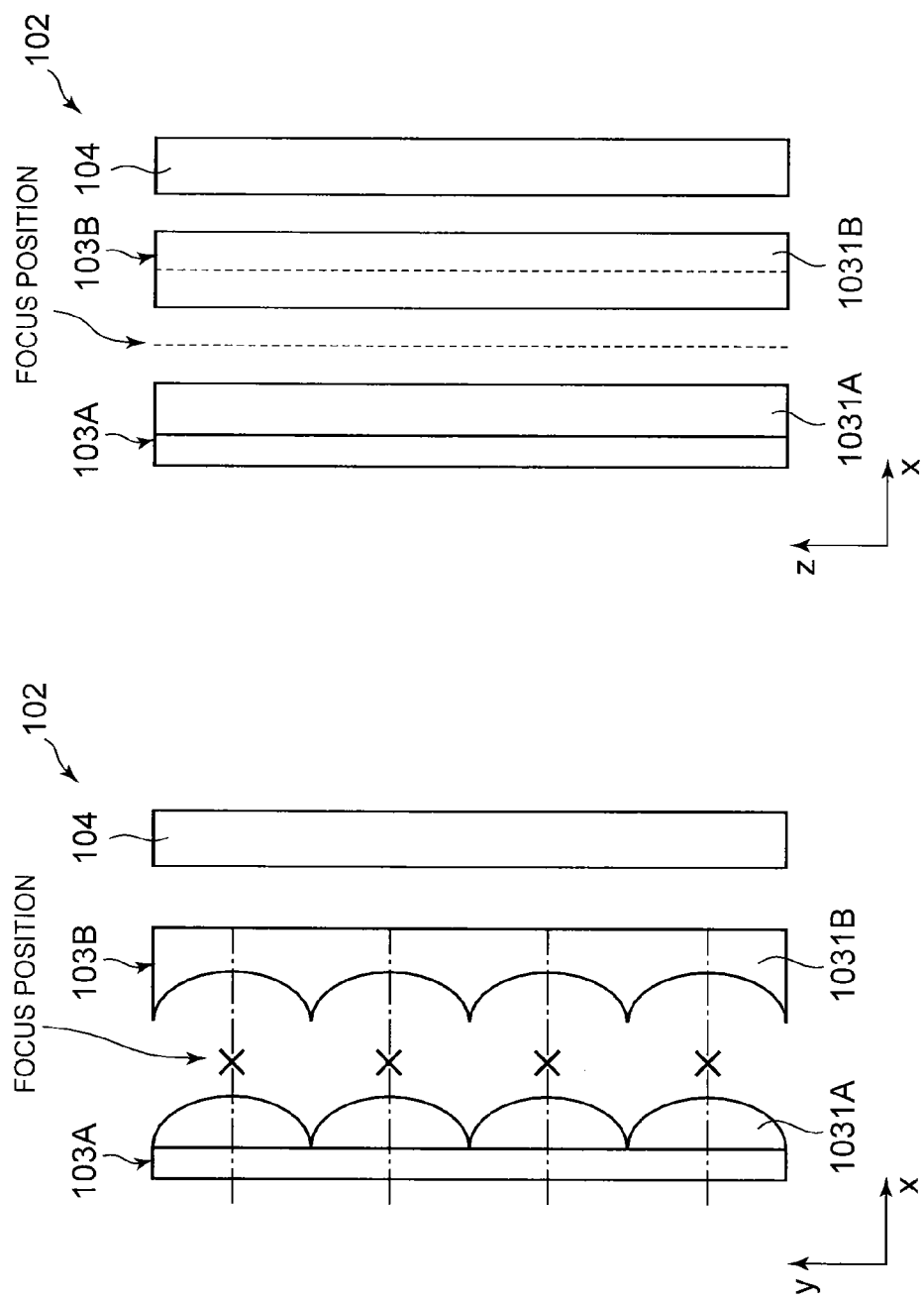
FIGS. 7A and 7B are views illustrating an image display portion according to a first modification.

FIGS. 7A and 7B are views illustrating the image display portion 102 according to the first example. In the image display portion 102 illustrated in FIG. 7A, the second lenticular lens 103B has concave second cylindrical lenses 1031B instead of the convex second cylindrical lenses 1031A.

The second lenticular lens 103B has concave surfaces which have negative refractive powers, and deflects beams in a horizontal plane (x-y plane) by refracting beams projected by a first lenticular lens 103A. By this means, lights are emitted at angles matching disparity image components to the diffusing portion 104. Here, the second lenticular lens 103B is a sheet member in which a plurality of concave second cylindrical lenses 1031B which has a bus in a vertical direction is aligned in the horizontal direction. The second lenticular lens 103B is provided such that optical axes (dashed-dotted lines in FIG. 7A) of the second cylindrical lenses 1031B match optical axes of the opposing first cylindrical lenses 1031A. Further, the concave incident surfaces are provided farther away from the first lenticular lens 103A than focus positions (symbols × in FIG. 7A) of the first cylindrical lenses 1031A. Pitches of the second cylindrical lenses 1031B (widths in the y axis direction) are about the same as pitches of the first cylindrical lenses 1031A (widths in the y axis direction).

Figure 8:
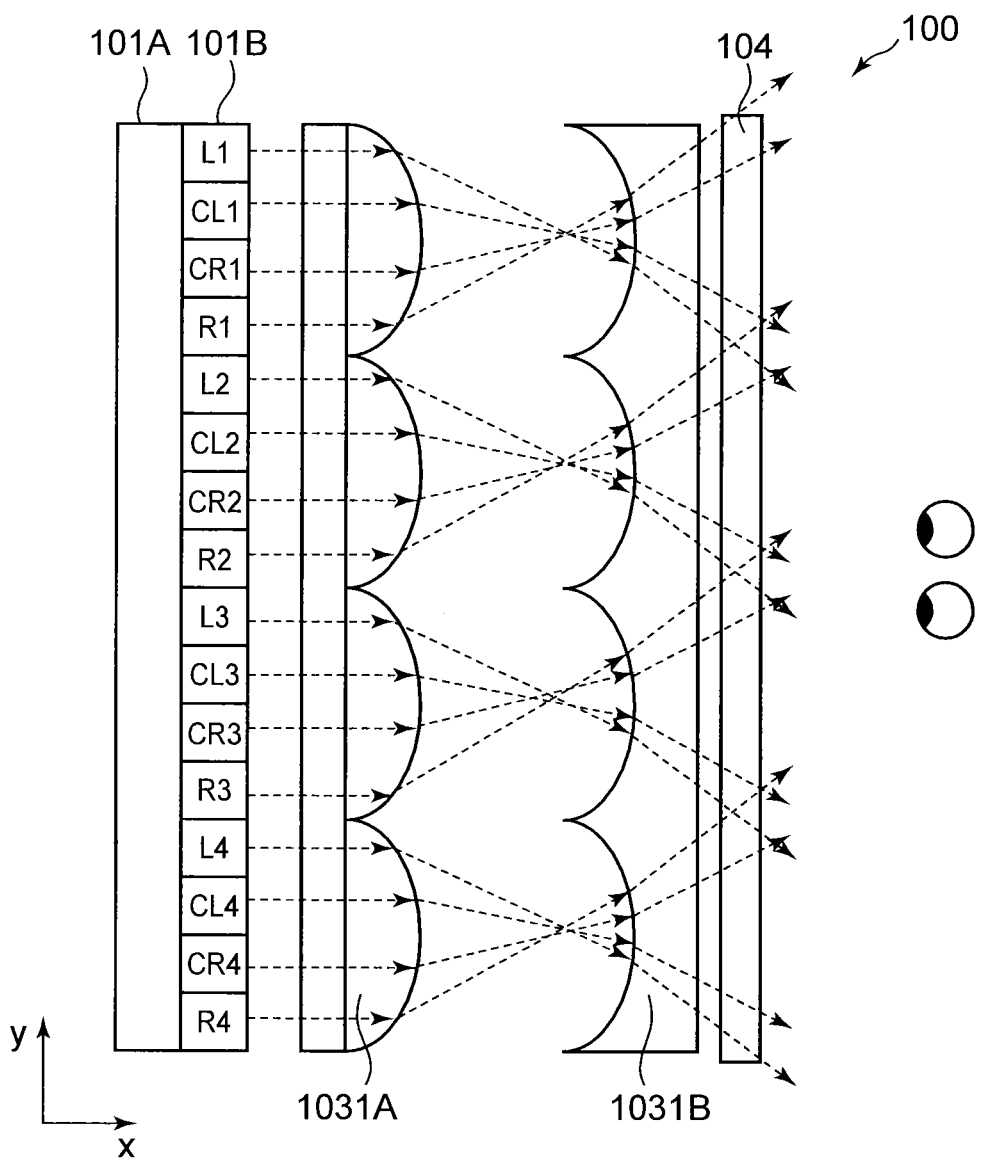
FIG. 8 is a view for explaining a function of an image display apparatus according to the first modification.

FIG. 8 is a view for explaining a function of an image display apparatus 100 according to the first modification. Thus, beams including disparity image components separated by the first cylindrical lenses 1031A are deflected in a direction in which a viewing zone angle is widen by negative refractive powers of the second cylindrical lenses 1031B.

In addition, the pitches of the second cylindrical lenses 1031B (the widths in the y axis direction) may also be made larger than the pitches of the first cylindrical lenses 1031A (the widths in the y axis direction). Consequently, it is possible to deflect beams around a screen to a center of the screen.

(Second Modification)

Although an example where pitches of first cylindrical lenses 1031A (widths in the y axis direction) are about the same as pitches of second cylindrical lenses 1031B (widths in the y axis direction) in an image display portion 102 illustrated in FIGS. 3A and 3B has been described, the present invention is not limited to this.

FIGS. 9A and 9B are views illustrating the image display portion 102 according to the second example. In the image display portion 102 illustrated in FIG. 9A, pitches of the first cylindrical lenses 1031A (widths in the y axis direction) are larger than pitches of the second cylindrical lenses 1031B (widths in the y axis direction). Further, a center axis (a broken line in FIG. 9A) of the first lenticular lens 103A and a center axis (a broken line in FIG. 9A) of the second lenticular lens 103B are provided to match. In this case, although shift amounts of optical axes of the opposing first cylindrical lenses 1031A and second cylindrical lenses 1031B in the y axis direction become more significant when the optical axes are more distant from the center axis, shift amounts 6 of the optical axes of the first cylindrical lenses 1031A and the second cylindrical lenses 1031B positioned at the farthest points are preferably ½ of the pitches of the first cylindrical lenses 1031A or less.

Figure 10:
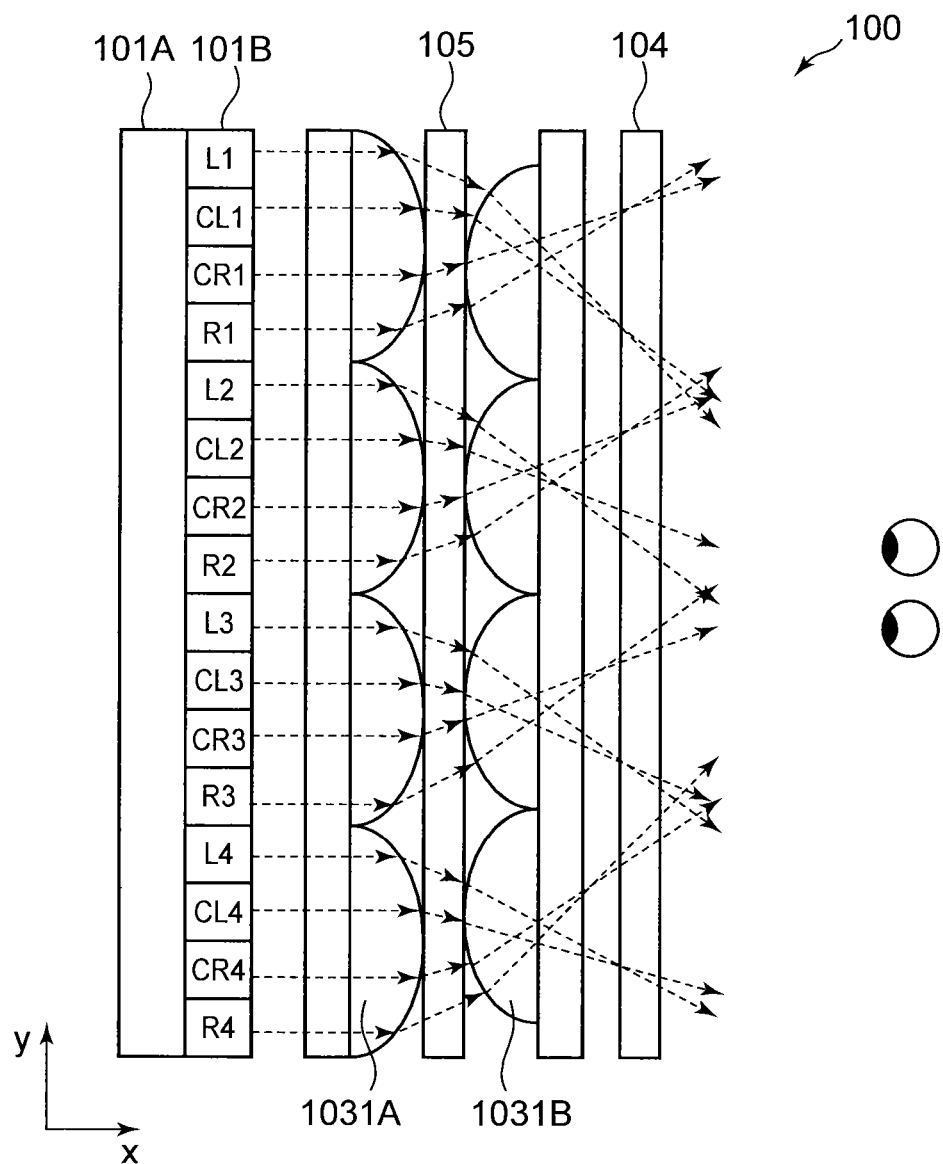
FIG. 10 is a view for explaining a function of an image display apparatus according to the second modification.
Figure 11A:
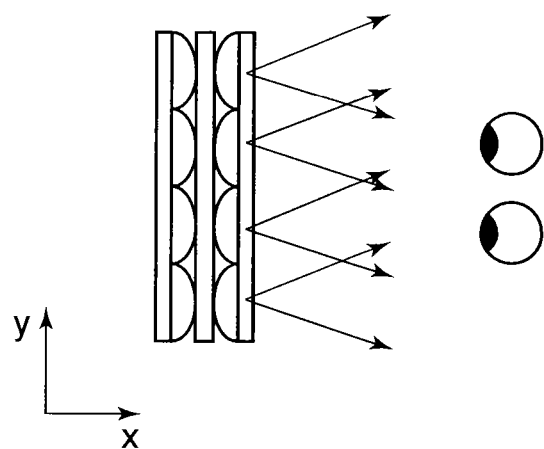
FIGS. 11A and 11B are views illustrating comparison of the image display portion according to the second modification.
Figure 11B:
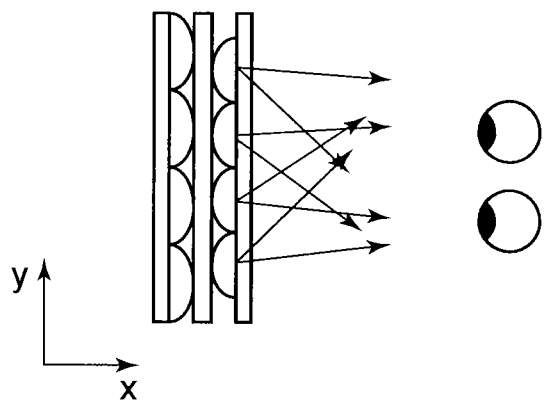

FIG. 10 is a view for explaining a function of an image display apparatus 100 according to the second modification. Further, FIGS. 11A and 11B are views illustrating comparison between the image display portion 102 illustrated in FIGS. 3A and 3B and the image display portion 102 according to the present modification. In addition, FIG. 11A illustrates the image display portion 102 according to the first embodiment, and FIG. 11B illustrates the image display portion 102 according to the present modification.

As illustrated in FIG. 10, the function of this image display apparatus 100 is basically similar to that in FIG. 6. However, the pitches of the first cylindrical lenses 1031A and the pitches of the second cylindrical lenses 1031B are different as described above, viewing zones surrounded by two beams are shifted toward the center axis (inward) as the beams are more distant from the center axis, as illustrated in FIG. 11B.

Further, the pitches of the second cylindrical lenses 1031B (the widths in the y axis direction) can also be made larger than the pitches of the first cylindrical lenses 1031A (the widths in the y axis direction) for the image display portion 102 illustrated in FIGS. 7A and 7B as illustrated in FIG. 9B. By this means, it is possible to deflect beams around a screen toward a center of the screen.

The image display apparatus 100 according to the present modification can reduce amounts of, for example, beams which are refracted by cylindrical lenses at the farthest points and which do not reach the observer. Consequently, it is possible to expand a range in which the observer can have a stereoscopic view in an observation region.

In addition, although the center axes of the first lenticular lens 103A and the second lenticular lens 103B match, the present invention is not limited to this. That is, when the observation region is intentionally shifted to the right or the left of the image display apparatus, it is possible to shift the center axes together in the y axis direction.

Hereinafter, further embodiments will be described with reference to the drawings. In the drawings, the same reference numerals denote the same or similar portions respectively.

Second Embodiment

Figure 12:
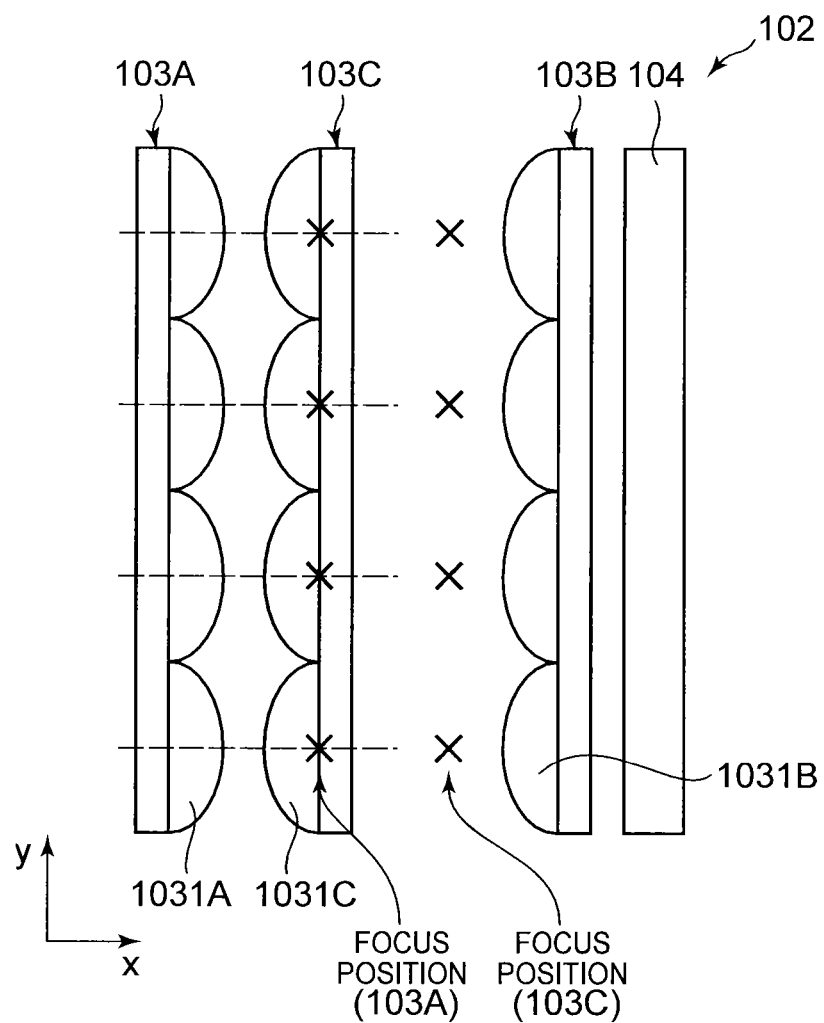
FIG. 12 is a view illustrating an image display portion according to a second embodiment.

FIG. 12 is a view illustrating an image display portion 102 according to a second embodiment. The image display portion 102 includes a third deflecting portion (third lenticular lens) 103C between a first lenticular lens 103A and a second lenticular lens 103B. In addition, the configuration similar to that of an image display apparatus 100 according to the first embodiment will not be described.

Figure 13:
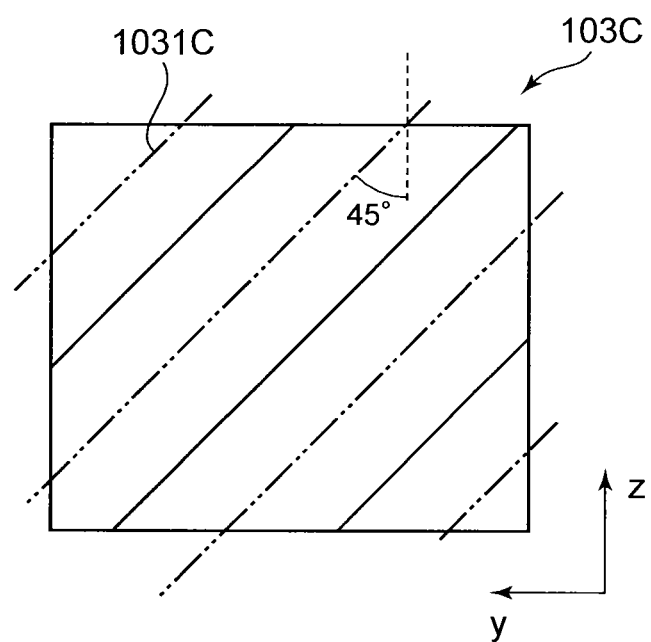
FIG. 13 is a view illustrating a third lenticular lens according to the second embodiment.

The third lenticular lens 103C is provided at focus positions of first cylindrical lenses 1031A. The third lenticular lens 103C illustrated in FIG. 13 is a sheet member in which a plurality of convex third cylindrical lenses 1031C which has a bus in a direction (fourth direction) which crosses a bus (vertical direction) of the first cylindrical lens 1031A at a predetermined angle φ (φ=45°) is aligned in a direction (fifth direction) orthogonal to the bus. In this case, the second lenticular lens 103B is provided at a position which twice as distant from the third lenticular lens 103C as a focal distance of the third lenticular lens 103C.

Figure 14:
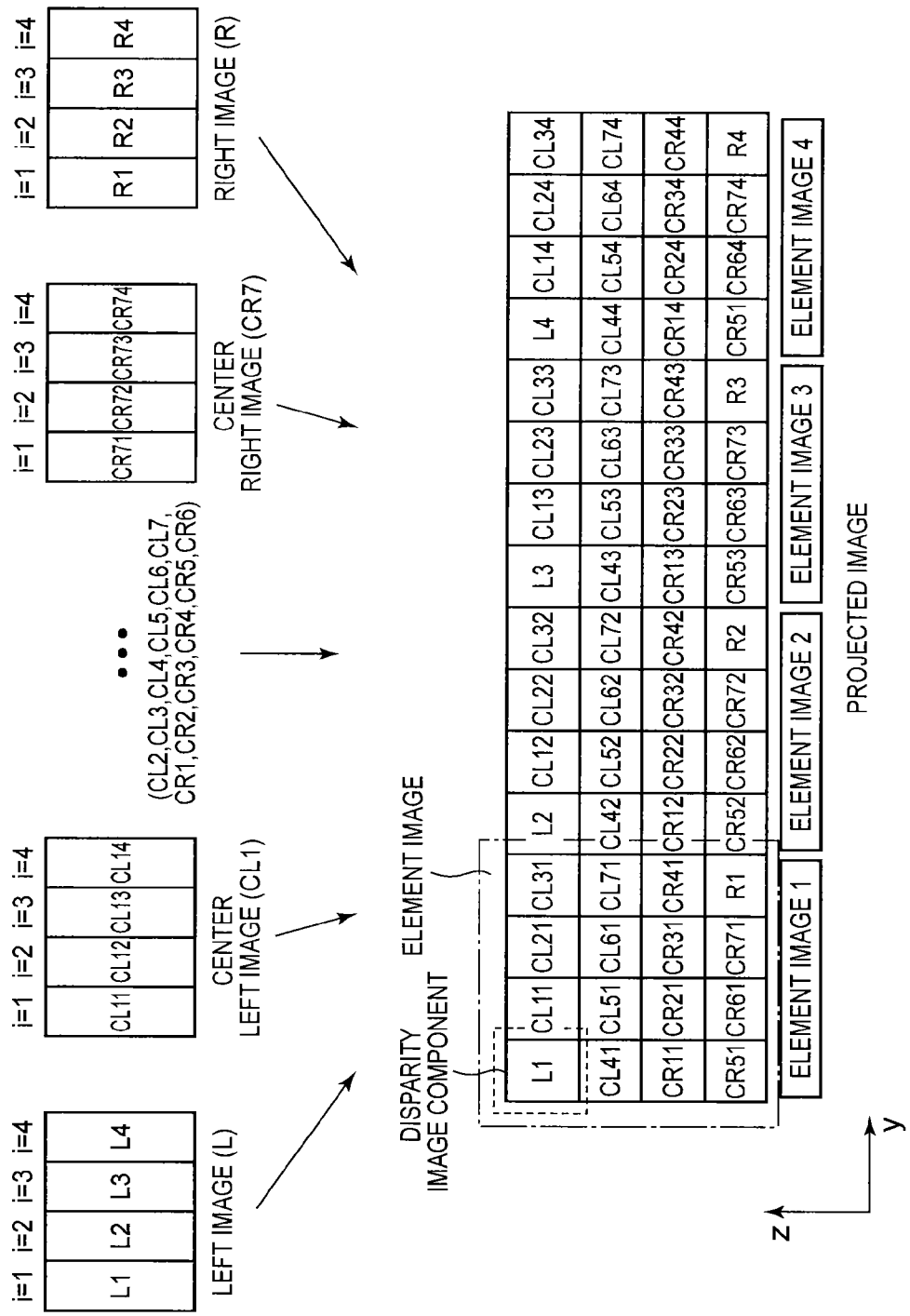
FIG. 14 is a view illustrating a projected image according to the second embodiment.

FIG. 14 is a view for explaining a projected image. In addition, the projected image illustrated in this example is an image including 16 disparities.

In an example in FIG. 14, 16 disparity images whose number is equal to the number of disparities, that is, left (L), center left 1 to 7 (CL11 to CL17), center right 1 to 7 (CR11 to CR17) and right (R) images are used. Disparity images are divided into four disparity image components, that is, into L1 to L4, CL11 to CL14, CL21 to CL24, CL31 to CL34, CL41 to CL44, CL51 to CL54, CL61 to CL64, CL71 to CL74, CR11 to CR14, CR21 to CR24, CR31 to CR34, CR41 to CR44, CR51 to CR54, CR61 to CR64, CR71 to CR74 and R1 to R4, respectively. An element image 1 is obtained by aligning disparity image components L1, CL11, CL21, CL31, CL41, CL51, CL61, CL71, CR11, CR21, CR31, CR41, CR51, CR61, CR71 and R1 in a matrix pattern of 4×4. Element images 2 to 4 are obtained likewise. These element image 1 to element image 4 are aligned in order of numbers to form a square projected image.

Figure 15:
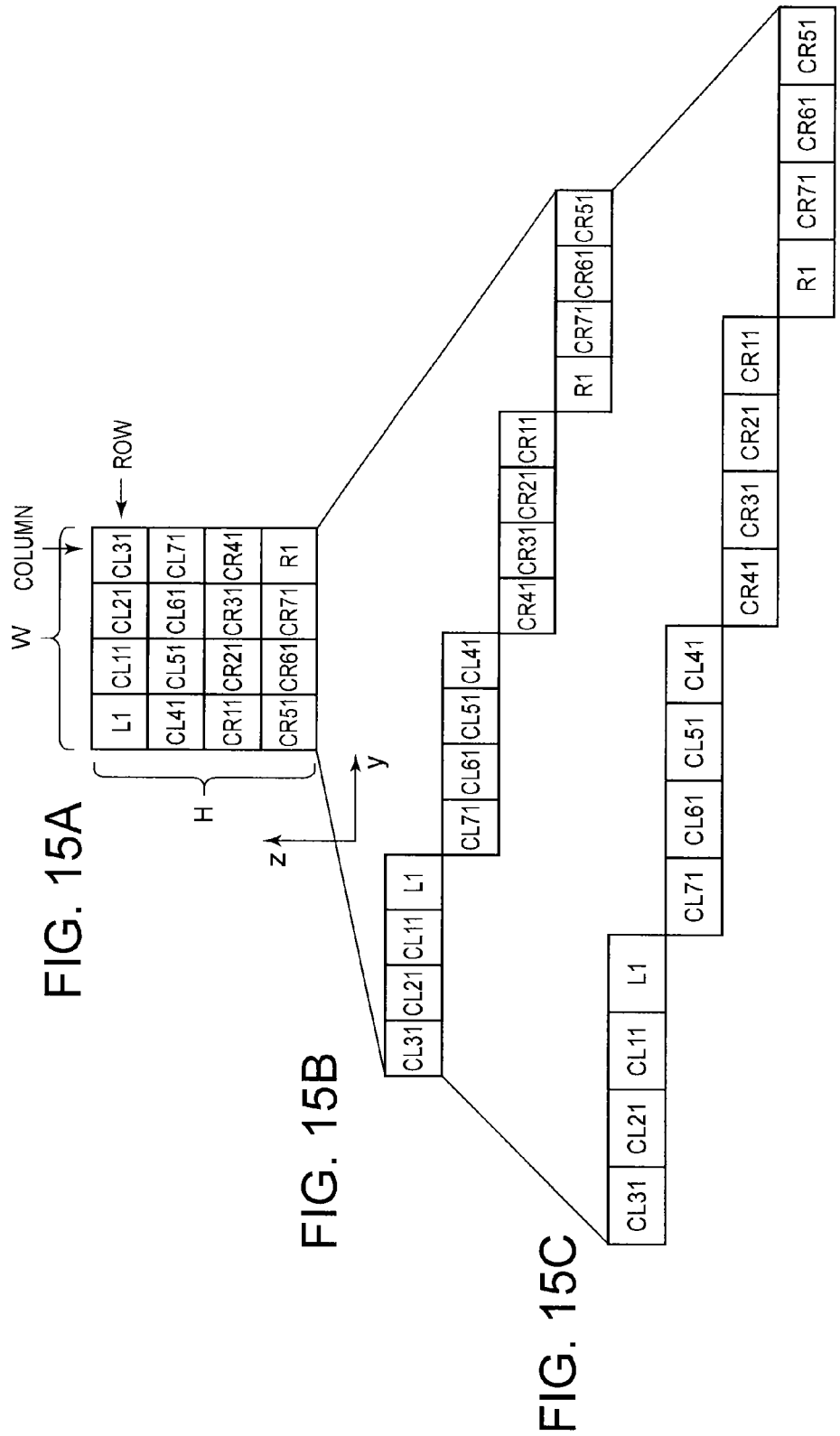
FIGS. 15A, 15B and 15C are views for explaining a function of the image display apparatus according to the second embodiment.

FIGS. 15A, 15B and 15C are views for explaining a function of an image display apparatus 200 according to the second embodiment.

Beams entering the first cylindrical lenses 1031A are emitted from the first cylindrical lenses 1031A at different angles per disparity image component, and a plurality of disparity image components can be separated in different directions (a). The beams emitted from the first cylindrical lenses 1031A enter the different third cylindrical lenses 1031C per element image.

The beams entering the third cylindrical lenses 1031C are emitted from the third cylindrical lenses 1031C as a column of one row (including differences in height) in the x axis direction when each row (y axis direction) of disparity image components of an element image is deflected in different directions (b). The beams emitted from the third cylindrical lenses 1031C enter the different second cylindrical lenses 1031B per element image.

The beams entering the second cylindrical lenses 1031B are further refracted in a direction toward the optical axes (inward) by positive refractive powers of the second cylindrical lenses 1031B (c). Thus, the beams including the disparity image components separated by the first cylindrical lenses 1031A and the third cylindrical lenses 1031C are deflected in a direction in which the above viewing zone angle is widen.

The beams emitted from the second cylindrical lenses 1031B are diffused in the vertical direction by a diffusing portion 104, and are projected on an observation region. The observer can stereoscopically view an image formed by these beams including the disparity image components by observing the image in the observation region.

The image display apparatus 200 according to the present embodiment can align disparity image components in the horizontal and vertical directions even when, for example, pitches of the cylindrical lenses of the first lenticular lens and the second lenticular lens are fixed, and, consequently, increase the number of disparities while keeping the same pixel pitches. Consequently, the observer can have a smooth stereoscopic view in a wider viewing zone in the observation region.

In addition, angles φ of the buses of the third cylindrical lenses 1031C are not limited to φ=45° and can be φ=a tan (W/H) where a pitch of a projected image in the horizontal direction is W and a pitch in the vertical direction is H. In this case, the third cylindrical lenses 1031C are provided at positions which are at a distance $d=f \times (1+1/\tan^2 \phi)$ from the third lenticular lens 103C where the focal distance of the third lenticular lens 103C is f.

Further, the third deflecting portion 103C may be a sheet member which has oblique prisms whose lens portions have planar surfaces instead of the third cylindrical lenses 1031C.

Furthermore, although the second embodiment has been described above based on the image display apparatus 100 according to the first embodiment, the second embodiment may naturally be described based on each modification of the image display apparatus 100 according to the first embodiment.

Third Embodiment

Figure 16:
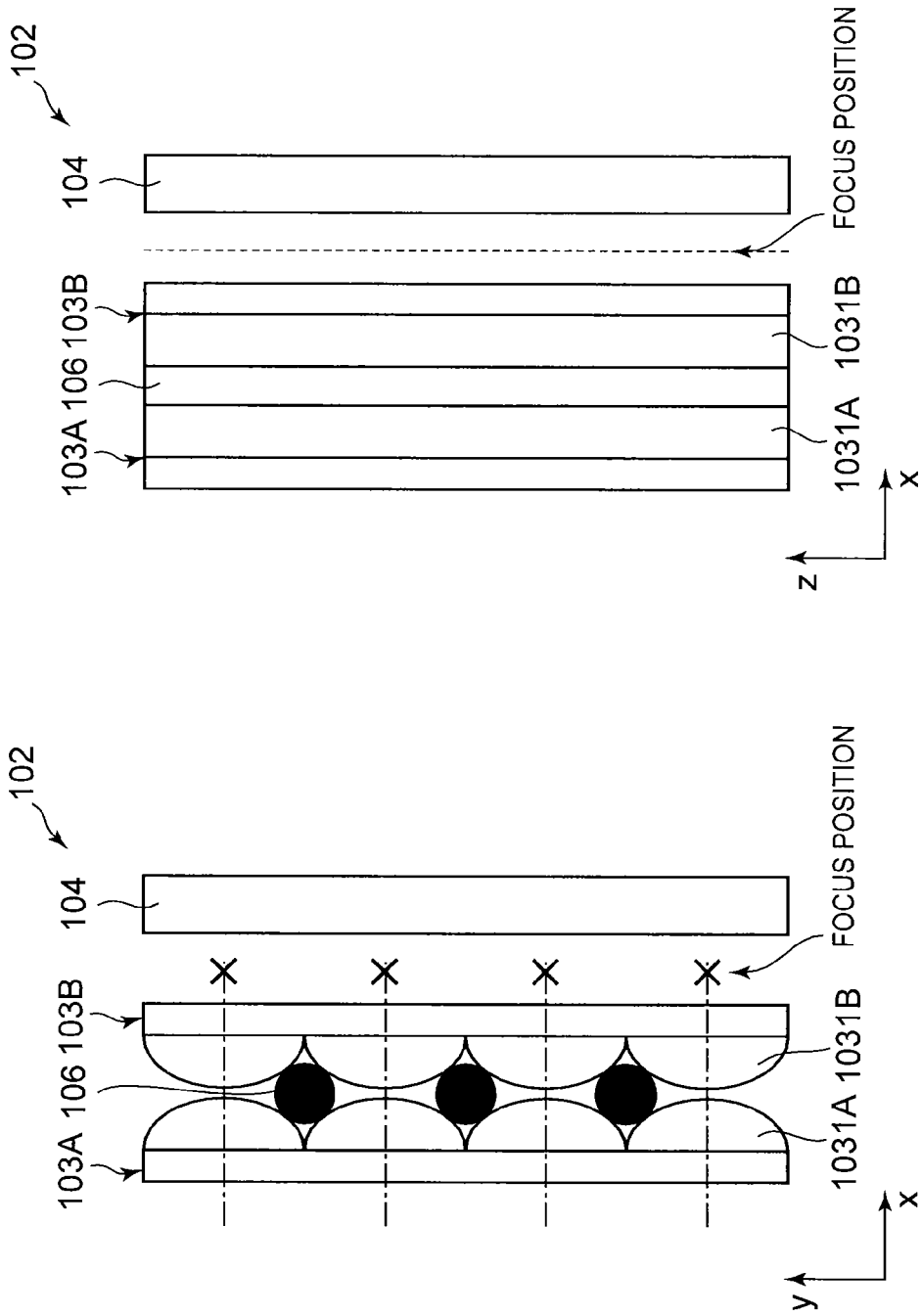
FIGS. 16A and 16B are views illustrating an image display portion according to a third embodiment.

FIGS. 16A and 16B are views illustrating an image display portion 102 according to a third embodiment. The image display portion 102 includes light blocking portions 106 between a first lenticular lens 103A and a second lenticular lens 103B. In addition, the configuration similar to that of an image display apparatus 100 according to the first embodiment will not be described.

Figure 17:
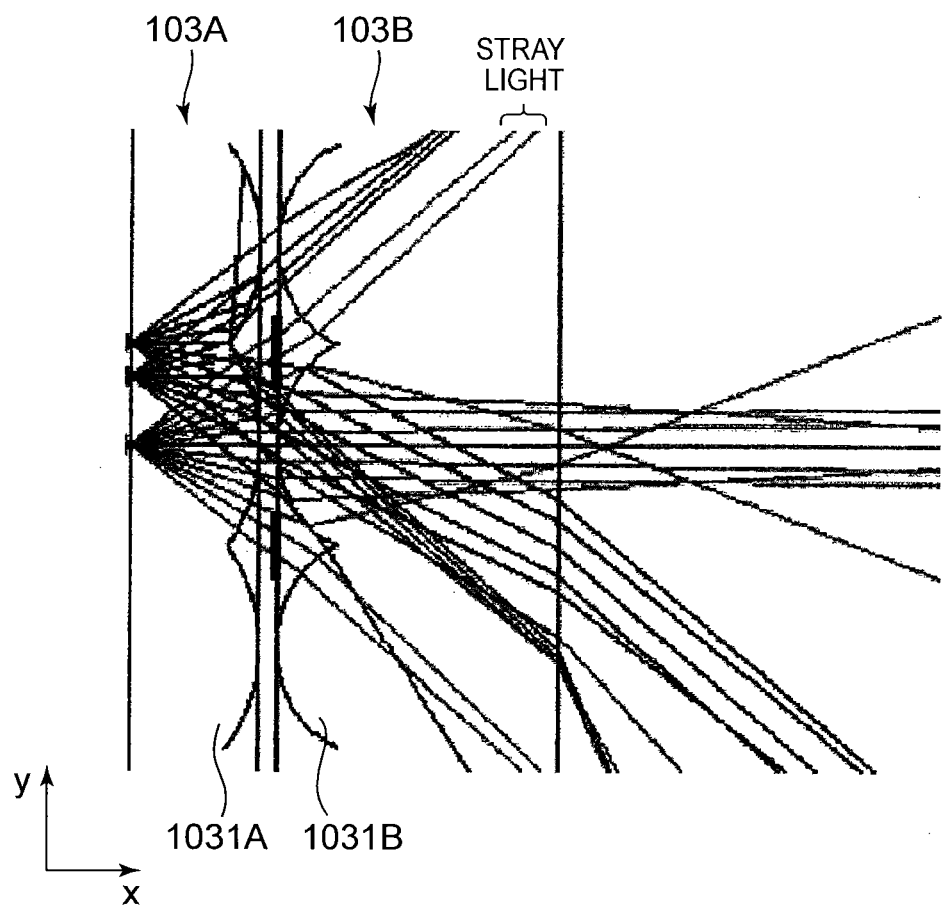
FIG. 17 is a view for explaining stray lights according to the third embodiment.

FIG. 17 is a view for explaining stray lights. Fundamentally, beams deflected by first cylindrical lenses 1031A preferably enter opposing second cylindrical lenses 1031B (referred to opposing lenses). However, as illustrated in FIG. 17, part of beams enter the neighboring second cylindrical lenses 1031B (neighboring lenses) of the opposing lenses without entering the opposing lenses. These beams become stray lights, and result in producing crosstalk when the beams are deflected in unintended directions.

The light blocking portions 106 are members which block beams (second beams) which are deflected by the first cylindrical lens 1031A and beams (stray lights) which enter the second cylindrical lens 1031B which opposes to the neighboring first cylindrical lens 1031A of this first cylindrical lens 1031A.

In an example in FIG. 16A, the light blocking portions 106 are columnar members such as wires whose materials are stainless steel and which are provided by being sandwiched between concave portions of the first lenticular lens 103A and concave portions of the second lenticular lens 103B. By this means, it is possible to block stray lights and, in addition, stably fix the first lenticular lens 103A and the second lenticular lens 103B. Further, portions other than the light blocking portions 106 can be formed as gaps by fixing the light blocking portions 106 without using, for example, a transparent plate or an adhesive, so that it is possible to keep a significant difference between refractive indices of the first lenticular lens 103A and the gaps and deflect beams emitted from the first lenticular lens 103A at greater angles.

Figure 18B:
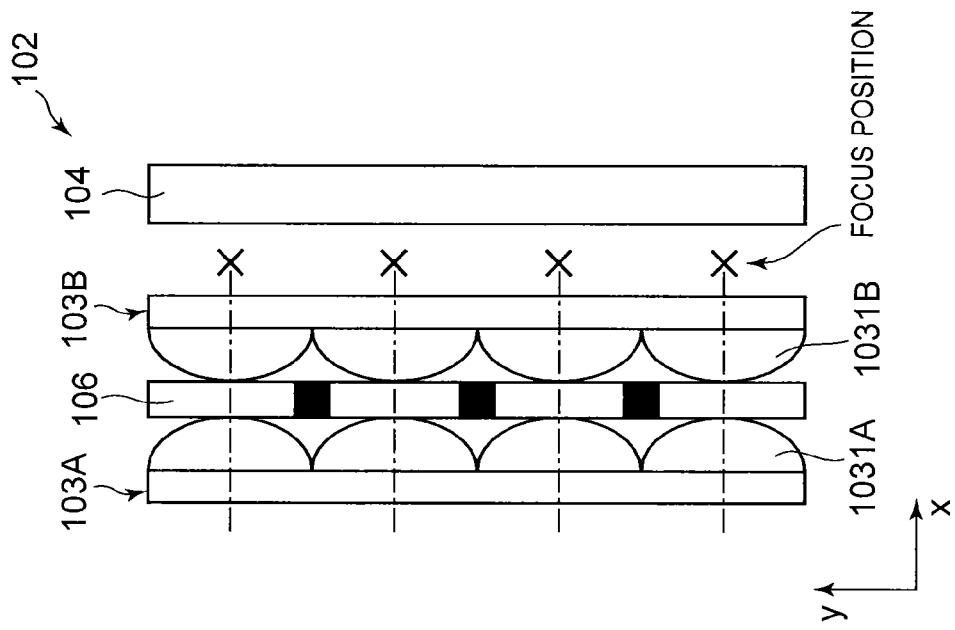
FIGS. 18A and 18B are views illustrating a modification of the image display portion according to the third embodiment.
Figure 18A:
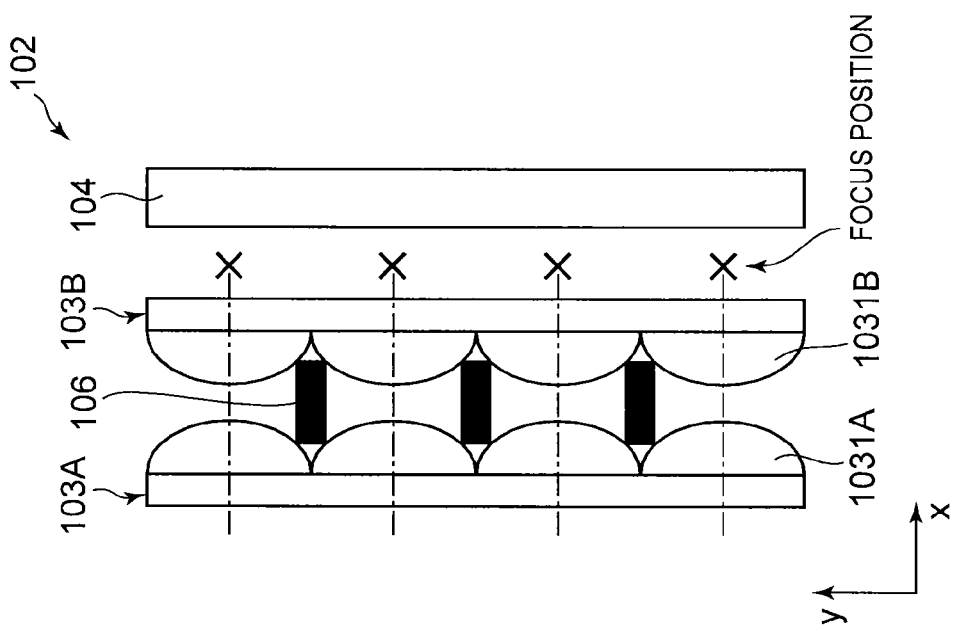

Furthermore, as illustrated in FIG. 18A, the light blocking portions 106 may be prismatic members such as thin films whose materials are copper and which are provided by being sandwiched between the concave portions of the first lenticular lens 103A and the concave portions of the second lenticular lens 103B. Still further, as illustrated in FIG. 18B, the light blocking portions 106 may be sheet members which are provided between the first lenticular lens 103A and the second lenticular lens 103B and which include light blocking or scattering patterns on lines connecting the concave portions of the first lenticular lens 103A and the concave portions of the second lenticular lens 103B. A light blocking or scattering pattern can be created by printing a black stripe pattern on a transparent flat plate.

In addition, although the third embodiment has been described based on the image display apparatus 100 according to the first embodiment, the third embodiment may naturally be described based on each modification of the image display apparatus 100 according to the first embodiment.

Fourth Embodiment

Figure 19:
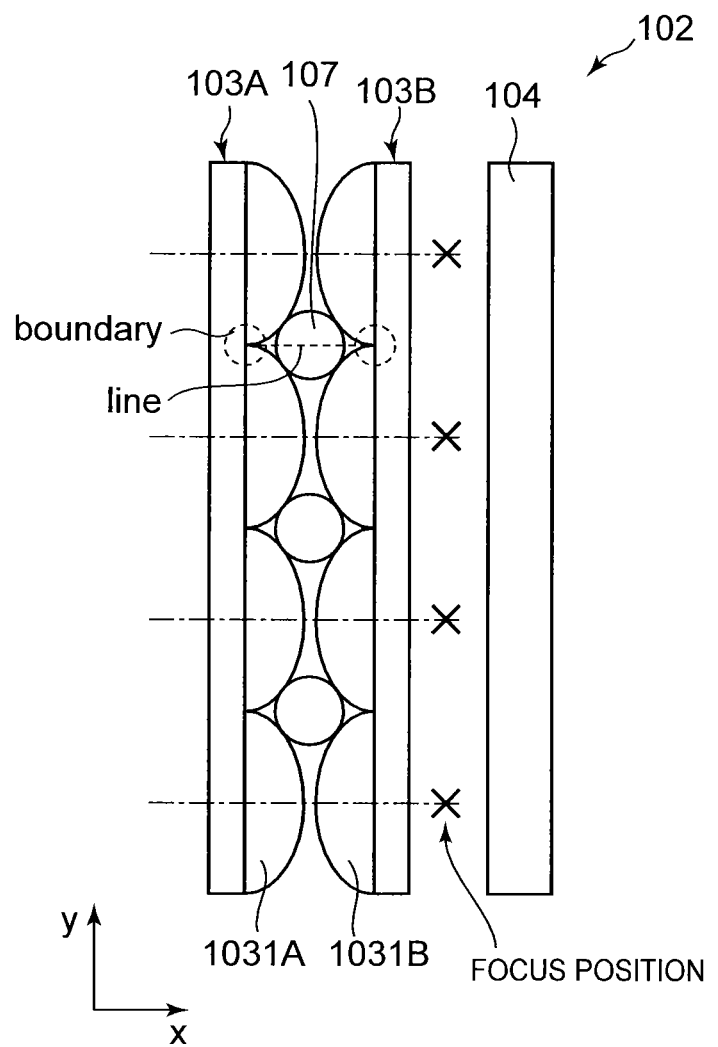
FIG. 19 is a view illustrating an image display portion according to a fourth embodiment.

FIG. 19 is a view illustrating an image display portion 102 according to a fourth embodiment. The image display portion 102 has refracting portions 107 between a first lenticular lens 103A and a second lenticular lens 103B. In addition, the configuration similar to that of an image display apparatus 100 according to the first embodiment will not be described.

As described above, fundamentally, beams deflected by first cylindrical lenses 1031A preferably enter opposing second cylindrical lenses 1031B (referred to as opposing lenses). However, as illustrated in FIG. 17, part of the beams enter the neighboring second cylindrical lenses 1031B (neighboring lenses) without entering the opposing lenses. These beams become stray lights, and result in producing crosstalk when the beams are deflected in unintended directions.

The refracting portion 107 is a member which refracts in the horizontal plane (x-y plane) beams (second beams) deflected by the first cylindrical lens 1031A and the beams (stray lights) entering the second cylindrical lens 1031B which opposes to the neighboring first cylindrical lens 1031A of this first cylindrical lens 1031A. The refracting portion 107 is provided on a line connecting a boundary between the neighboring first cylindrical lenses 1031A (the apex of the concave portion of the first lenticular lens 103A) and a boundary between the neighboring second cylindrical lenses 1031B (the apex of the concave portion of the second lenticular lens 103B). Further, the surface of the refracting portion 107 is a curved surface, and this curvature radius is preferably sufficiently smaller than curvature radii of the first cylindrical lenses 1031A and the second cylindrical lenses 1031B.

In this example, the refracting portions 107 are transparent columnar members which are provided by being sandwiched between concave portions of the first lenticular lens 103A and concave portions of the second lenticular lens 103B and which allows transmission of visible light. That is, glass or plastic such as PMMA can be used for the refracting portions 107.

Beams (stray lights) refracted by the refracting portions 107 are further refracted in the horizontal plane (x-y plane) by the second cylindrical lenses 1031B, so that it is possible to decrease intensities of stray lights which reach the observer to sufficiently low levels compared to intensities of beams which essentially need to reach the observer. Consequently, it is possible to reduce crosstalk between disparities.

Figure 20:
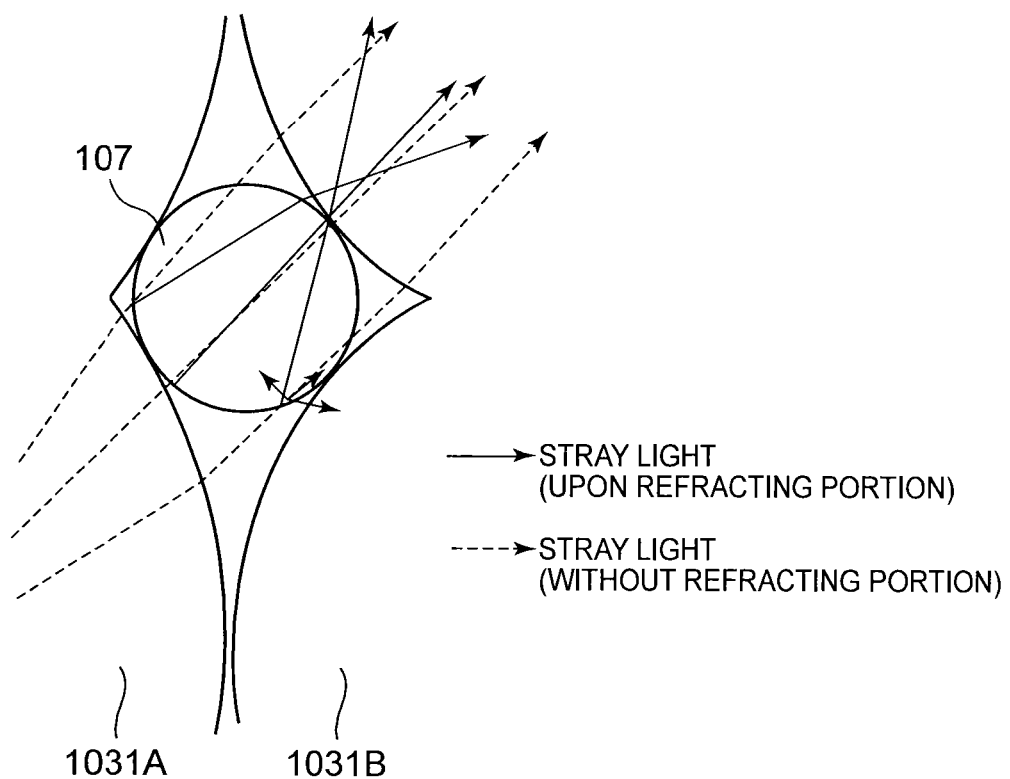
FIG. 20 is a view for explaining a function according to the fourth embodiment.

FIG. 20 is a view for explaining a function according to the present embodiment and is a schematic view illustrating paths of beams (stray lights). In addition, in FIG. 20, broken line arrows indicate paths of beams when the refracting portions 107 are not provided and solid line arrows indicate paths of beams when the refracting portions 107 are provided. As illustrated in FIG. 20, when the refracting portions 107 are not provided, the beams (stray lights) emitted to air from the first lenticular lens 103A travel straightforward in the air and enter the second lenticular lens 103B. Meanwhile, when the refracting portions 107 are provided, the beams (stray lights) emitted to the air from the first lenticular lens 103A are refracted by the refracting portions 107 and enter the second lenticular lens 103B. In this case, the beams (stray lights) when the refracting portions 107 are provided are refracted at great angles in the horizontal plane (x-y plane) compared to the beams when the refracting portions 107 are not provided. Further, part of beams are reflected or diffused on the surfaces of the refracting portions 107. Consequently, when the refracting portions 107 are provided, it is possible to reduce intensities of the beams (stray lights) which reach the observer compared to the beams when the refracting portions 107 are not provided.

Figure 21A:
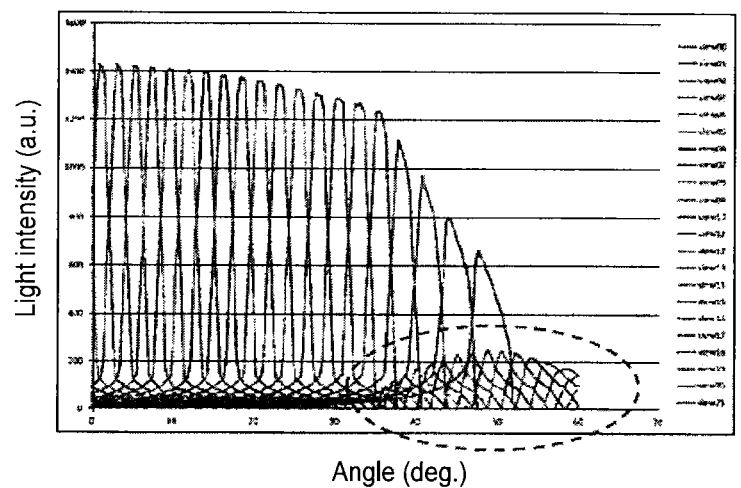
FIGS. 21A and 21B are views for explaining the function according to the fourth embodiment.
Figure 21B:
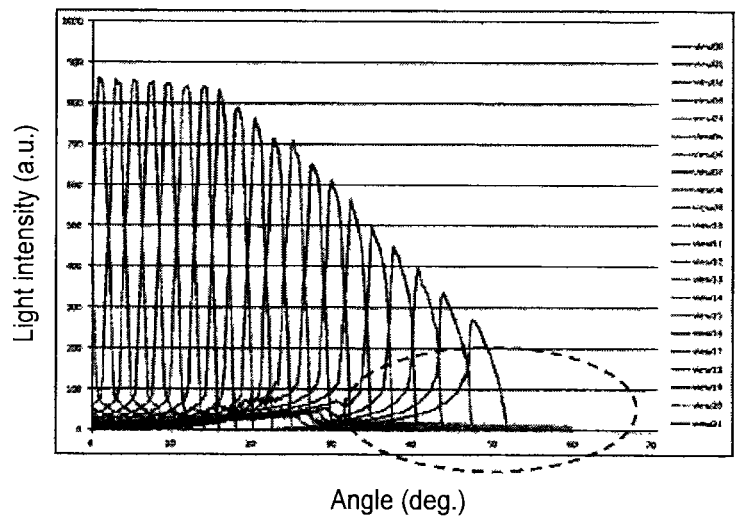

FIGS. 21A and 21B are views for explaining the function according to the present embodiment, and illustrate examples of calculation results of light amount distributions. A horizontal axis indicates a position in the y axis direction, and a vertical axis indicates a light amount of a beam at each position in the y axis direction. In addition, FIG. 21A illustrates the calculation result when the refracting portions 107 are not provided, and FIG. 21B illustrates the calculation result when the refracting portions 107 are provided. In the respective figures, peaks of light amounts which appear in portions encircled by dotted lines represent that there are stray light components at positions in the y axis direction. That is, in this region, two types of distributions overlap, and a correct image and an image of a wrong angle overlap and are seen. As is clear from FIGS. 21A and 21B, when the refracting portions 107 are provided (FIG. 21B), it is possible to reduce the intensities of stray lights compared to intensities when the refracting portions 107 are not provided (FIG. 21A).

According to the present embodiment, it is possible to reduce crosstalk between disparities by reducing intensities of stray lights. In this case, the amount of light which illuminates a printed image and the amount of light which reaches the observer can be increased by using the transparent refracting portions 107 in the present embodiment instead of using light blocking portions 106 in the second embodiment for blocking stray lights. Therefore, the observer can observe a brighter projected image. Further, by providing the refracting portions 107 between concave portions of the first lenticular lens 103A and concave portions of the second lenticular lens 103B, it is possible to easily align both of the lenticular lenses 103A and 103B and stably fix both of the lenticular lenses 103A and 103B. Furthermore, by fixing the lenticular lenses 103A and 103B without using, for example, a transparent plate or an adhesive, portions other than the light blocking portions 106 can be formed as gaps, so that it is possible to keep a significant difference between refractive indices of the first lenticular lens 103A and the gaps and deflect the beams emitted from the first lenticular lens 103A at greater angles.

In addition, by doping the refracting portions 107 with, for example, a fluorescent material which is excited by ultraviolet light, it is possible to absorb ultraviolet light (having a wavelength of, for example, 200 nm to 400 nm) included in illumination light, emit visible light (having a wavelength of, for example, 400 nm to 800 nm) and further increase the amount of light which illuminates a printed image. Further, the refracting portions 107 may also be used as conduction paths through which illumination light propagates. By projecting, for example, LED lights from ends of the refracting portions 107 and providing defects to the refracting portions 107 on a printed image side, it is also possible to diffuse guided light toward the printed image and illuminate the printed image. For example, such processing the fine uneven surface, the refractive portion 107 may have a function to diffuse light. It may be, which allows to reduce the amount of stray light as compared to when they have a smooth surface refractive portion 107 is transparent, reaching the viewer by diffusing stray light and further reduce cross-talk.

Figure 22:
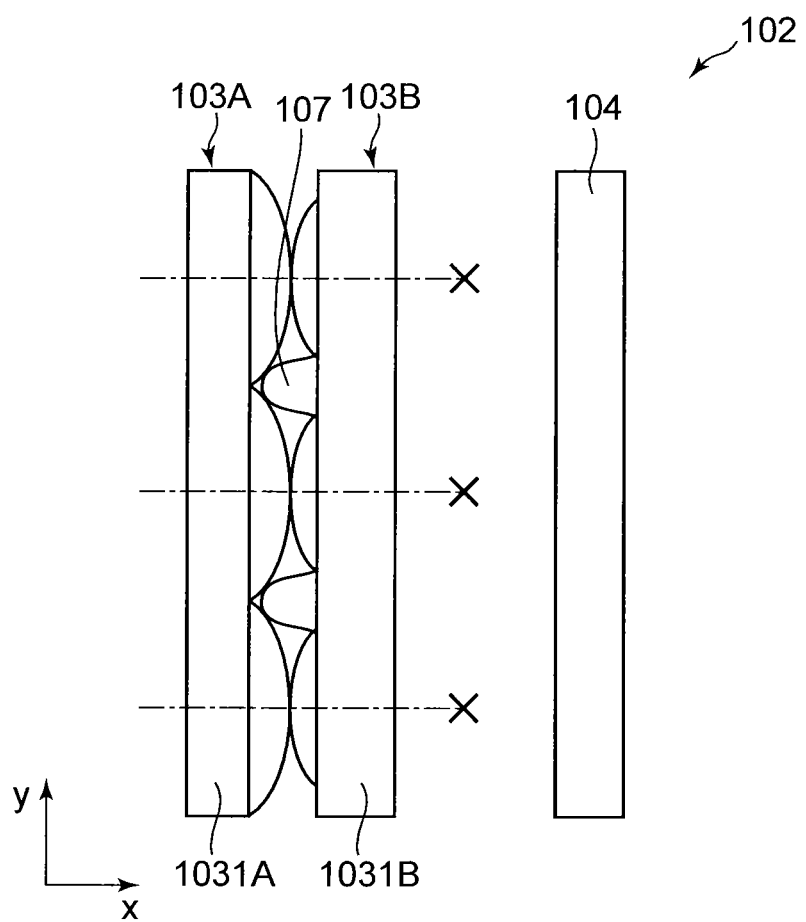
FIG. 22 is a view illustrating a modification of the image display portion according to the fourth embodiment.

FIG. 22 is a view illustrating a modification of an image display portion 102 according to the fourth embodiment. Refracting portions 107 in FIG. 22 are integrally molded with a second deflecting portion 103B. The integrally molded refracting portion 107 desirably has a curved surface at a front end of a projecting portion, and this curved surface and a wall surface cause refraction or internal reflection of stray light components. The wall surface of the projecting portion may not be vertical but may be tapered, and is desirably tapered to increase manufacturability upon molding. Consequently, it is easy to manufacture an image display apparatus 100.

The image display apparatus according to at least one of the above-described embodiments can expand a viewing zone angle and reduce crosstalk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display apparatus, comprising:
    a projecting portion which projects, in a second direction crossing a first direction, a first beam having a disparity image component which forms an image having a disparity in the first direction;
    a first deflecting portion which deflects the first beam in the second direction in a first plane having an axis in the first direction and an axis in the second direction, and obtains a second beam; and
    a second deflecting portion which further deflects in the first plane the second beam in a same direction as the second direction in which the first deflecting portion deflects the first beam, obtains a third beam and projects the third beam, wherein
    the first deflecting portion is a lenticular lens in which a plurality of first cylindrical lenses that have a convex first incident surface that the first beam enters are aligned in the first direction, and which refracts the first beam, which enters the first incident surface,
    the second deflecting portion is a lenticular lens in which a plurality of second cylindrical lenses that have a convex second incident surface that the second beam enters are aligned in the first direction, wherein the second incident surface is provided closer to the first deflecting portion than focus positions of the first cylindrical lenses and which refracts the second beam which enters the second incident surface,
    the first cylindrical lenses and the second cylindrical lenses oppose each other,
    the image display apparatus further includes a light blocking portion that blocks a beam that is deflected by a first cylindrical lens and which enters a second cylindrical lens that opposes a neighboring first cylindrical lens of the first cylindrical lenses, wherein the light blocking portions are columnar members that are sandwiched between concave portions of said first cylindrical lenses and concave portions of said second cylindrical lenses,
    the first incident surface and the second incident surface oppose each other in the second direction,
    the image display apparatus further comprises a refracting portion provided on a line connecting a boundary between the neighboring first cylindrical lenses and a boundary between the neighboring second cylindrical lenses, and which refracts the second beam, and
    the refracting portion is integrally molded with one of the first deflecting portion and the second deflecting portion.

2. The apparatus according to claim 1, wherein the refracting portion is a columnar member which allows transmission of visible light, and which is in contact with part of the first cylindrical lenses and part of the second cylindrical lenses.

3. An image display apparatus comprising:
    a projecting portion that includes a printed image and projects, in a second direction orthogonal to a first direction, a first beam having a disparity image component that forms an image having a disparity in the first direction;
    a first deflecting portion that deflects the first beam in the second direction in a first plane having an axis in the first direction and an axis in the second direction, and obtains a second beam; and
    a second deflecting portion that further deflects, in the first plane, the second beam in a same direction as the second direction in which the first deflecting portion deflects the first beam, obtains a third beam and projects the third beam, wherein
    the first deflecting portion is a lenticular lens in which a plurality of first cylindrical lenses that have a convex first incident surface that the first beam enters are aligned in the first direction, and which refracts the first beam, which enters the first incident surface,
    the second deflecting portion is a lenticular lens in which a plurality of second cylindrical lenses that have a convex second incident surface that the second beam enters are aligned in the first direction, wherein the second incident surface is provided closer to the first deflecting portion than focus positions of the first cylindrical lenses and which refracts the second beam which enters the second incident surface,
    the first cylindrical lenses and the second cylindrical lenses oppose to each other,
    the image display apparatus further comprises a light blocking portion, which blocks a beam deflected by a first cylindrical lens and which enters a second cylindrical lens that opposes a neighboring first cylindrical lens of the first cylindrical lenses,
    the light blocking portions are columnar members that are sandwiched between concave portions of said first cylindrical lenses and concave portions of said second cylindrical lenses,
    the first incident surface and the second incident surface oppose each other in the second direction,
    the image display apparatus further comprises a refracting portion provided on a line connecting a boundary between the neighboring first cylindrical lenses and a boundary between the neighboring second cylindrical lenses, and which refracts the second beam, and
    the refracting portion is integrally molded with one of the first deflecting portion and the second deflecting portion.

4. An image display apparatus, comprising:
    a projecting portion that includes a printed image and projects, in a second direction orthogonal to a first direction, a first beam having a disparity image component that forms an image having a disparity in the first direction;
    a first deflecting portion that deflects the first beam in the second direction in a first plane having an axis in the first direction and an axis in the second direction, and obtains a second beam; and
    a second deflecting portion which further deflects, in the first plane, the second beam in a same direction as the second direction in which the first deflecting portion deflects the first beam, obtains a third beam and projects the third beam, wherein the first deflecting portion is a lenticular lens in which a plurality of first cylindrical lenses that have a convex first incident surface that the first beam enters are aligned in the first direction, and which refracts the first beam which enters the first incident surface, the second deflecting portion is a lenticular lens in which a plurality of second cylindrical lenses that have a convex second incident surface that the second beam enters are aligned in the first direction, wherein the second incident surface is provided closer to the first deflecting portion than focus positions of the first cylindrical lenses and which refracts the second beam which enters the second incident surface, the first incident surface and the second incident surface oppose to each other in the second direction, the image display apparatus further comprises a refracting portion which is provided on a line connecting a boundary between the neighboring first cylindrical lenses and a boundary between the neighboring second cylindrical lenses, and which refracts the second beam, the light blocking portions are columnar members that are sandwiched between concave portions of said first cylindrical lenses and concave portions of said second cylindrical lenses, the first incident surface and the second incident surface oppose each other in the second direction, the image display apparatus further comprises a refracting portion provided on a line connecting a boundary between the neighboring first cylindrical lenses and a boundary between the neighboring second cylindrical lenses, and which refracts the second beam, and the refracting portion is integrally molded with one of the first deflecting portion and the second deflecting portion.

5. The apparatus according to claim 4, wherein the refracting portion is a columnar member which allows transmission of visible light, and which is in contact with part of the first cylindrical lenses and part of the second cylindrical lenses.

* * * * *